United States Patent
Wang

(10) Patent No.: US 12,501,394 B2
(45) Date of Patent: Dec. 16, 2025

(54) POSITIONING METHOD AND ELECTRONIC DEVICE

(71) Applicant: Huawei Technologies Co., Ltd., Shenzhen (CN)

(72) Inventor: Tongbo Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 432 days.

(21) Appl. No.: 17/927,939

(22) PCT Filed: May 21, 2021

(86) PCT No.: PCT/CN2021/095351
§ 371 (c)(1),
(2) Date: Nov. 28, 2022

(87) PCT Pub. No.: WO2021/244335
PCT Pub. Date: Dec. 9, 2021

(65) Prior Publication Data
US 2023/0209497 A1    Jun. 29, 2023

(30) Foreign Application Priority Data
May 30, 2020    (CN) .......................... 202010480900.6

(51) Int. Cl.
| H04L 1/00 | (2006.01) |
| H04W 48/20 | (2009.01) |
| H04W 64/00 | (2009.01) |
| H01Q 21/28 | (2006.01) |

(52) U.S. Cl.
CPC ........ *H04W 64/003* (2013.01); *H04W 48/20* (2013.01); *H01Q 21/28* (2013.01)

(58) Field of Classification Search
CPC .......... H04W 64/00; H04B 2001/0408; H04B 1/0085; H04B 1/0078; H04B 7/10; H04B 7/12; H04B 7/14
See application file for complete search history.

(56) References Cited

U.S. PATENT DOCUMENTS

2007/0152880 A1    7/2007  Chang et al.
2020/0132855 A1*   4/2020  Lee .......................... G01S 19/22

FOREIGN PATENT DOCUMENTS

| CN | 101377544 A | 3/2009 |
| CN | 201910852 U | 7/2011 |
| CN | 102223172 A | 10/2011 |
| CN | 204331036 U | 5/2015 |
| CN | 105048091 A | 11/2015 |

(Continued)

*Primary Examiner* — Phuoc H Doan
(74) *Attorney, Agent, or Firm* — Conley Rose, P.C.

(57) ABSTRACT

A positioning method includes receiving, by an electronic device, a first satellite signal using a first antenna, and obtaining, by the electronic device, a first signal quality of the first satellite signal. When the electronic device is in a landscape posture, receiving, by the electronic device, a second satellite signal using a second antenna; and obtaining, by the electronic device, a second signal quality of the second satellite signal. If the first signal quality is lower than the second signal quality, performing, by the electronic device, positioning using the second antenna. If the first signal quality is higher than the second signal quality, performing, by the electronic device, positioning using the first antenna.

20 Claims, 18 Drawing Sheets

(56) References Cited

FOREIGN PATENT DOCUMENTS

| CN | 105510941 | A | 4/2016 |
|---|---|---|---|
| CN | 105723241 | A | 6/2016 |
| CN | 106058470 | A | 10/2016 |
| CN | 106199653 | A | 12/2016 |
| CN | 206059672 | U | 3/2017 |
| CN | 110545135 | A | 12/2019 |

\* cited by examiner

POSITIONING METHOD AND ELECTRONIC DEVICE

CROSS-REFERENCE TO RELATED APPLICATIONS

This is a U.S. National Stage of International Patent Application No. PCT/CN2021/095351 filed on May 21, 2021, which claims priority to Chinese Patent Application No. 202010480900.6 filed on May 30, 2020. Both of the aforementioned applications are hereby incorporated by reference in their entireties.

TECHNICAL FIELD

The present invention relates to the field of electronic technologies, and in particular, to a positioning method and an electronic device.

BACKGROUND

Currently, a satellite positioning antenna (for example, a global positioning system (global positioning system, GPS) antenna, a BeiDou positioning antenna, or a global navigation satellite system positioning antenna) is installed in most electronic devices. The electronic device may receive a satellite signal by using a satellite positioning antenna, to implement a positioning function. Strength of the satellite signal received by the satellite positioning antenna affects positioning accuracy of the electronic device. A stronger satellite signal received by the satellite positioning antenna indicates more accurate positioning of the electronic device. When the satellite positioning antenna faces the sky, the satellite positioning antenna can better receive a satellite signal. In this way, positioning of the electronic device is also more accurate. Generally, a GPS antenna in the electronic device is installed in an upper left corner (that is, close to a camera) when the electronic device is in a portrait posture, for example, a satellite positioning antenna 10a in an electronic device 100 shown in FIG. 1A and FIG. 1B. The electronic device in FIG. 1A may have a cellular antenna 10b and a mobile communication main antenna 10c that are configured to receive cellular mobile signals of low, medium, and high frequency bands. The electronic device in FIG. 1B may further include a diversity antenna 10e used for cellular data transmission, a Wi-Fi antenna 10g, and a chip 10f configured to process a satellite signal or a signal. In the electronic device shown in FIG. 1A and FIG. 1B, the satellite positioning antenna 10a is located in the upper left corner of the electronic device 100. In this way, when the electronic device 100 is in the portrait posture, the satellite positioning antenna faces the sky, to better receive a satellite signal. However, when the electronic device is in a landscape posture, an orientation of the satellite positioning antenna of the electronic device changes. Consequently, positioning accuracy of the electronic device is affected.

Therefore, how to improve positioning accuracy of an electronic device in a landscape posture is an urgent problem to be resolved.

SUMMARY

This application provides a positioning method and an electronic device. When the electronic device is in a landscape posture, the electronic device may select, based on factors such as quantities of satellites respectively received by a vertical antenna and a horizontal antenna, and quality of satellite signals respectively received by the vertical antenna and the horizontal antenna, the vertical or the horizontal antenna to receive a satellite signal. Then, the electronic device performs positioning based on a satellite signal received by the vertical antenna or the horizontal antenna. In this way, positioning accuracy of the electronic device in the landscape posture can be improved.

According to a first aspect, this application provides a positioning method, used in an electronic device. The electronic device includes a first antenna and a second antenna. The method includes: When the electronic device is in a portrait mode, the electronic device receives a first satellite signal by using a first antenna. When the electronic device is in a landscape mode, the electronic device receives a second satellite signal by using a second antenna. When signal quality of the first satellite signal is lower than signal quality of the second satellite signal, the electronic device performs positioning by using the second antenna. Alternatively, when signal quality of the first satellite signal is higher than signal quality of the second satellite signal, the electronic device performs positioning by using the first antenna.

The first satellite signal includes satellite signals of a plurality of satellites that are received by using the first antenna, and the second satellite signal includes satellite signals of the plurality of satellites that are received by using the second antenna.

A main lobe direction in an antenna directivity pattern of the first antenna is different from a main lobe direction in an antenna directivity pattern of the second antenna.

According to the positioning method provided in this embodiment of this application, when the electronic device is in the landscape mode, the electronic device may select, based on signal quality of satellite signals respectively received by the first antenna and the second antenna, an antenna with best quality of received satellite signals when the electronic device is in the landscape mode to perform positioning. In this way, positioning accuracy of the electronic device in the landscape mode can be improved.

In a possible implementation, when the signal quality of the first satellite signal is lower than the signal quality of the second satellite signal, the electronic device performs positioning by using the first antenna and the second antenna. That is, the electronic device in the landscape mode may use two antennas for positioning. In this way, positioning accuracy of the electronic device in the landscape mode can be improved.

In a possible implementation, when the signal quality of the first satellite signal is equal to the signal quality of the second satellite signal, the electronic device performs positioning by using the second antenna. Because the electronic device has switched to the second antenna to receive a signal, in this case, positioning may be directly performed by using the second antenna. In this way, the electronic device can be prevented from switching back to the first antenna, thereby reducing power consumption of the electronic device.

In a possible implementation, that the electronic device performs positioning by using the first antenna and the second antenna includes: The electronic device determines location information based on the first satellite signal and the second satellite signal.

In a possible implementation, that the electronic device determines the location information based on the first satellite signal and the second satellite signal specifically includes: The electronic device combines the first satellite signal and the second satellite signal to obtain a third satellite signal.

In a possible implementation, that the electronic device combines the first satellite signal and the second satellite signal to obtain the third satellite signal includes: The electronic device extracts, from the first satellite signal and the second satellite signal, satellite signals with the highest signal quality respectively corresponding to a plurality of satellites, to obtain the third satellite signal.

In a possible implementation, that the electronic device combines the first satellite signal and the second satellite signal to obtain the third satellite signal specifically includes: The electronic device determines, from the first satellite signal and the second satellite signal, satellite signals respectively corresponding to L different satellites, and determines the satellite signals respectively corresponding to the L different satellites as the third satellite signal. When a first satellite in the L different satellites corresponds to one satellite signal, the electronic device places the one satellite signal corresponding to the first satellite into the third satellite signal. When a second satellite in the L different satellites corresponds to two satellite signals, the electronic device adjusts the two satellite signals corresponding to the second satellite to be in a same phase, adds the two satellite signals in the same phase to form one satellite signal, and places the one satellite signal into the third satellite signal.

In a possible implementation, that the electronic device adjusts the two satellite signals corresponding to the second satellite to be in the same phase, adds the two satellite signals in the same phase to form one satellite signal, and places the one satellite signal into the third satellite signal specifically includes: The electronic device adjusts the two satellite signals corresponding to the second satellite to be in the same phase. The electronic device obtains weights respectively corresponding to the two satellite signals. The electronic device multiplies the two satellite signals in the same phase by the respective weights, then performs addition to form one satellite signal, and places the one satellite signal into the third satellite signal.

In a possible implementation, before the electronic device combines the first satellite signal and the second satellite signal to obtain the third satellite signal, the method includes: The electronic device performs signal processing on the first satellite signal and the second satellite signal. In this way, interference caused by another interference signal to the first satellite signal and the second satellite signal can be reduced.

In a possible implementation, that the electronic device performs signal processing on the first satellite signal and the second satellite signal specifically includes: The electronic device separately filters the first satellite signal and the second satellite signal by using a surface acoustic wave filter. The electronic device separately amplifies the first satellite signal and the second satellite signal by using a low noise amplifier.

In a possible implementation, after the electronic device combines the first satellite signal and the second satellite signal to obtain the third satellite signal, the method includes: The electronic device performs signal processing on the third satellite signal.

In a possible implementation, that the electronic device performs signal processing on the third satellite signal specifically includes: The electronic device filters the third satellite signal by using the surface acoustic wave filter.

According to a second aspect, this application provides a positioning method, used in an electronic device. The electronic device includes a first antenna and a second antenna. The method includes: The electronic device performs positioning by using the first antenna and the second antenna. When signal quality of a first satellite signal received by the first antenna is higher than a first threshold, the electronic device performs positioning by using the first antenna.

A main lobe direction in an antenna directivity pattern of the first antenna is different from a main lobe direction in an antenna directivity pattern of the second antenna.

According to the positioning method provided in this application, to ensure positioning accuracy of the electronic device, the electronic device may perform positioning by using the first antenna and the second antenna by default. When positioning performed by the electronic device by using the first antenna can also meet a positioning accuracy requirement, the electronic device performs positioning by using the first antenna. In this way, power consumption of the electronic device can be reduced.

In a possible implementation, that the electronic device performs positioning by using the first antenna and the second antenna includes: The electronic device determines location information based on the first satellite signal and a second satellite signal, where the second satellite signal is a satellite signal received by the second antenna.

In a possible implementation, that the electronic device determines the location information based on the first satellite signal and the second satellite signal specifically includes: The electronic device combines the first satellite signal and the second satellite signal to obtain a third satellite signal.

In a possible implementation, that the electronic device combines the first satellite signal and the second satellite signal to obtain the third satellite signal includes: The electronic device extracts, from the first satellite signal and the second satellite signal, satellite signals with the highest signal quality respectively corresponding to a plurality of satellites, to obtain the third satellite signal.

In a possible implementation, that the electronic device combines the first satellite signal and the second satellite signal to obtain the third satellite signal specifically includes: The electronic device determines, from the first satellite signal and the second satellite signal, satellite signals respectively corresponding to L different satellites, and determines the satellite signals respectively corresponding to the L different satellites as the third satellite signal. When a first satellite in the L different satellites corresponds to one satellite signal, the electronic device places the one satellite signal corresponding to the first satellite into the third satellite signal. When a second satellite in the L different satellites corresponds to two satellite signals, the electronic device adjusts the two satellite signals corresponding to the second satellite to be in a same phase, adds the two satellite signals in the same phase to form one satellite signal, and places the one satellite signal into the third satellite signal.

In a possible implementation, that the electronic device adjusts the two satellite signals corresponding to the second satellite to be in the same phase, adds the two satellite signals in the same phase to form one satellite signal, and places the one satellite signal into the third satellite signal specifically includes: The electronic device adjusts the two satellite signals corresponding to the second satellite to be in the same phase. The electronic device obtains weights respectively corresponding to the two satellite signals. The electronic device multiplies the two satellite signals in the same phase by the respective weights, then performs addition to form one satellite signal, and places the one satellite signal into the third satellite signal.

In a possible implementation, before the electronic device combines the first satellite signal and the second satellite signal to obtain the third satellite signal, the method includes: The electronic device performs signal processing on the first satellite signal and the second satellite signal. In this way, interference caused by another interference signal to the first satellite signal and the second satellite signal can be reduced.

In a possible implementation, that the electronic device performs signal processing on the first satellite signal and the second satellite signal specifically includes: The electronic device separately filters the first satellite signal and the second satellite signal by using a surface acoustic wave filter. The electronic device separately amplifies the first satellite signal and the second satellite signal by using a low noise amplifier.

In a possible implementation, after the electronic device combines the first satellite signal and the second satellite signal to obtain the third satellite signal, the method includes: The electronic device performs signal processing on the third satellite signal.

In a possible implementation, that the electronic device performs signal processing on the third satellite signal specifically includes: The electronic device filters the third satellite signal by using the surface acoustic wave filter.

According to a third aspect, this application provides a positioning method, used in an electronic device. The electronic device includes a first antenna and a second antenna. The method includes: The electronic device performs positioning by using the first antenna. When signal quality of a first satellite signal received by the first antenna is lower than a second threshold, the electronic device performs positioning by using the first antenna and the second antenna.

A main lobe direction in an antenna directivity pattern of the first antenna is different from a main lobe direction in an antenna directivity pattern of the second antenna.

According to the positioning method provided in this application, the electronic device may perform positioning by using the first antenna by default. In this way, power consumption of the electronic device can be reduced. When the signal quality of the first satellite signal received by the first antenna cannot meet a positioning accuracy requirement of the electronic device, the electronic device performs positioning by using the first antenna and the second antenna. In this way, positioning accuracy of the electronic device can be improved.

In a possible implementation, that the electronic device performs positioning by using the first antenna and the second antenna includes: The electronic device determines location information based on the first satellite signal and a second satellite signal, where the second satellite signal is a satellite signal received by the second antenna.

In a possible implementation, that the electronic device determines the location information based on the first satellite signal and the second satellite signal specifically includes: The electronic device combines the first satellite signal and the second satellite signal to obtain a third satellite signal.

In a possible implementation, that the electronic device combines the first satellite signal and the second satellite signal to obtain the third satellite signal includes: The electronic device extracts, from the first satellite signal and the second satellite signal, satellite signals with the highest signal quality respectively corresponding to a plurality of satellites, to obtain the third satellite signal.

In a possible implementation, that the electronic device combines the first satellite signal and the second satellite signal to obtain the third satellite signal specifically includes: The electronic device determines, from the first satellite signal and the second satellite signal, satellite signals respectively corresponding to L different satellites, and determines the satellite signals respectively corresponding to the L different satellites as the third satellite signal. When a first satellite in the L different satellites corresponds to one satellite signal, the electronic device places the one satellite signal corresponding to the first satellite into the third satellite signal. When a second satellite in the L different satellites corresponds to two satellite signals, the electronic device adjusts the two satellite signals corresponding to the second satellite to be in a same phase, adds the two satellite signals in the same phase to form one satellite signal, and places the one satellite signal into the third satellite signal.

In a possible implementation, that the electronic device adjusts the two satellite signals corresponding to the second satellite to be in the same phase, adds the two satellite signals in the same phase to form one satellite signal, and places the one satellite signal into the third satellite signal specifically includes: The electronic device adjusts the two satellite signals corresponding to the second satellite to be in the same phase. The electronic device obtains weights respectively corresponding to the two satellite signals. The electronic device multiplies the two satellite signals in the same phase by the respective weights, then performs addition to form one satellite signal, and places the one satellite signal into the third satellite signal.

In a possible implementation, before the electronic device combines the first satellite signal and the second satellite signal to obtain the third satellite signal, the method includes: The electronic device performs signal processing on the first satellite signal and the second satellite signal. In this way, interference caused by another interference signal to the first satellite signal and the second satellite signal can be reduced.

In a possible implementation, that the electronic device performs signal processing on the first satellite signal and the second satellite signal specifically includes: The electronic device separately filters the first satellite signal and the second satellite signal by using a surface acoustic wave filter. The electronic device separately amplifies the first satellite signal and the second satellite signal by using a low noise amplifier.

In a possible implementation, after the electronic device combines the first satellite signal and the second satellite signal to obtain the third satellite signal, the method includes: The electronic device performs signal processing on the third satellite signal.

In a possible implementation, that the electronic device performs signal processing on the third satellite signal specifically includes: The electronic device filters the third satellite signal by using the surface acoustic wave filter.

According to a fourth aspect, an electronic device is provided, including: a baseband processor, a first antenna, a second antenna, and a path selection module. The first antenna and the second antenna are separately coupled to the path selection module, and the path selection module is coupled to the baseband processor.

The first antenna is configured to receive a first satellite signal.

The second antenna is configured to receive a second satellite signal.

The path selection module is configured to select the first antenna or the second antenna to receive a satellite signal.

The baseband processor is configured to: when signal quality of the first satellite signal is lower than signal quality of the second satellite signal, perform positioning by using the second antenna; or when signal quality of the first satellite signal is higher than signal quality of the second satellite signal, perform positioning by using the first antenna.

In a possible implementation, a main lobe direction in an antenna directivity pattern of the first antenna is different from a main lobe direction in an antenna directivity pattern of the second antenna.

In a possible implementation, the electronic device further includes: a first radio frequency module and a second radio frequency module. That the first antenna and the second antenna are separately coupled to the path selection module specifically includes: The first antenna is coupled to the path selection module by using the first radio frequency module, and the second antenna is coupled to the path selection module by using the second radio frequency module.

The first radio frequency module is configured to transmit the first satellite signal.

The second radio frequency module is configured to transmit the second satellite signal.

In a possible implementation, the first radio frequency module includes a first surface acoustic wave filter and a first low noise amplifier.

The first surface acoustic wave filter is configured to filter the first satellite signal.

The first low noise amplifier is configured to amplify the first satellite signal.

In a possible implementation, the second radio frequency module includes a second surface acoustic wave filter and a second low noise amplifier.

The second surface acoustic wave filter is configured to filter the first satellite signal.

The second low noise amplifier is configured to amplify the first satellite signal.

In a possible implementation, the baseband processor is further configured to: when the signal quality of the first satellite signal is lower than the signal quality of the second satellite signal, perform positioning by using the first antenna and the second antenna.

In a possible implementation, the baseband processor is specifically configured to determine location information based on the first satellite signal and the second satellite signal.

In a possible implementation, the baseband processor is specifically configured to combine the first satellite signal and the second satellite signal to obtain a third satellite signal.

In a possible implementation, the baseband processor is specifically configured to extract, from the first satellite signal and the second satellite signal, satellite signals with the highest signal quality respectively corresponding to a plurality of satellites, to obtain a third signal.

In a possible implementation, the baseband processor is specifically configured to: determine, from the first satellite signal and the second satellite signal, satellite signals respectively corresponding to L different satellites, and determine the satellite signals respectively corresponding to the L different satellites as the third satellite signal, when a first satellite in the L different satellites corresponds to one satellite signal, place the one satellite signal corresponding to the first satellite into the third satellite signal; and when a second satellite in the L different satellites corresponds to two satellite signals, adjust the two satellite signals corresponding to the second satellite to be in a same phase, add the two satellite signals in the same phase to form one satellite signal, and place the one satellite signal into the third satellite signal.

In a possible implementation, the baseband processor is specifically configured to: adjust the two satellite signals corresponding to the second satellite to be in the same phase; obtain weights respectively corresponding to the two satellite signals; and multiply the two satellite signals in the same phase by the respective weights, then perform addition to form one satellite signal, and place the one satellite signal into the third satellite signal.

According to a fifth aspect, this application provides an electronic device, including a first antenna, a second antenna, one or more processors, and one or more memories. A main lobe direction in an antenna directivity pattern of the first antenna is different from a main lobe direction in an antenna directivity pattern of the second antenna. The first antenna, the second antenna, and the one or more memories are separately coupled to one or more processors. The one or more memories are configured to store computer program code, and the computer program code includes computer instructions. When the computer instructions are run on the processor, the electronic device is enabled to perform the positioning method in any one of the possible implementations of the first aspect, the second aspect, and the third aspect.

According to a sixth aspect, this application provides a positioning chip. The positioning chip is used in a positioning apparatus. The positioning apparatus includes a first antenna and a second antenna. The positioning chip is configured to: when signal quality of a first satellite signal is lower than signal quality of a second satellite signal, perform positioning by using the second antenna, where the first satellite signal is a satellite signal received by the first antenna, and the second satellite signal is a satellite signal received by the second antenna; or when signal quality of a first satellite signal is higher than signal quality of a second satellite signal, perform positioning by using the first antenna.

In a possible implementation, the positioning chip is further configured to: when the signal quality of the first satellite signal is lower than the signal quality of the second satellite signal, and the electronic device performs positioning by using the first antenna and the second antenna.

In a possible implementation, the positioning chip is specifically configured to determine location information based on the first satellite signal and the second satellite signal.

In a possible implementation, the positioning chip is specifically configured to combine the first satellite signal and the second satellite signal to obtain a third satellite signal.

In a possible implementation, the positioning chip is specifically configured to extract, from the first satellite signal and the second satellite signal, satellite signals with the highest signal quality respectively corresponding to a plurality of satellites, to obtain a third signal.

In a possible implementation, the positioning chip is specifically configured to: determine, from the first satellite signal and the second satellite signal, satellite signals respectively corresponding to L different satellites, and determine the satellite signals respectively corresponding to the L different satellites as the third satellite signal; when a first satellite in the L different satellites corresponds to one satellite signal, place the one satellite signal corresponding to the first satellite into the third satellite signal; and when a second satellite in the L different satellites corresponds to two satellite signals, adjust the two satellite signals corresponding to the second satellite to be in a same phase, add the two satellite signals in the same phase to form one satellite signal, and place the one satellite signal into the third satellite signal.

In a possible implementation, the positioning chip is specifically configured to: adjust the two satellite signals corresponding to the second satellite to be in the same phase; obtain weights respectively corresponding to the two satellite signals; and multiply the two satellite signals in the same phase by the respective weights, then perform addition to form one satellite signal, and place the one satellite signal into the third satellite signal.

According to a seventh aspect, this application provides a computer storage medium, including computer instructions. When the computer instructions are run on an electronic device, a communication apparatus is enabled to perform the positioning method in any one of the possible implementations of the first aspect, the second aspect, and the third aspect.

According to an eighth aspect, an embodiment of this application provides a computer program product. When the computer program product runs on a computer, the computer is enabled to perform the positioning method in any one of the possible implementations of the first aspect, the second aspect, and the third aspect.

BRIEF DESCRIPTION OF DRAWINGS

To describe the technical solutions in embodiments of this application more clearly, the following describes the accompanying drawings used in embodiments of this application.

DESCRIPTION OF EMBODIMENTS

The following clearly describes the technical solutions in embodiments of this application with reference to the accompanying drawings. In the descriptions of embodiments of this application, "/" means or unless otherwise specified. For example, A/B may represent A or B. "and/or" in the text describes only an association relationship for describing associated objects and represents that three relationships may exist. For example, A and/or B may represent the following three cases: Only A exists, both A and B exist, and only B exists. In addition, in the descriptions of embodiments of this application, "a plurality of" means two or more.

The following terms "first" and "second" are merely intended for a purpose of description, and shall not be understood as implying or implying relative importance or implicitly indicating a quantity of indicated technical features. Therefore, a feature limited by "first" or "second" may explicitly or implicitly include one or more of the features. In the descriptions of embodiments of this application, unless otherwise specified, "a plurality of" means two or more. In addition, the terms "including", "having", or any other variant thereof in descriptions of this application are intended to cover a non-exclusive inclusion. For example, a process, a method, a system, a product, or a device that includes a series of steps or units is not limited to the listed steps or units, but optionally further includes other unlisted steps or units, or optionally further includes another inherent step or unit of the process, the method, the product, or the device. It should be noted that, in embodiments of this application, the word "example" or "for example" is used to represent giving an example, an illustration, or a description. Any embodiment or design scheme described as an "example" or "for example" in embodiments of this application should not be explained as being more preferred or having more advantages than another embodiment or design scheme. Exactly, use of the word "example", "for example", or the like is intended to present a related concept in a specific manner.

The following explains and describes some concepts in embodiments of this application, for example, an antenna facing the sky, a portrait posture, and a landscape posture.

(1) The Antenna Facing the Sky

Figure 1A:
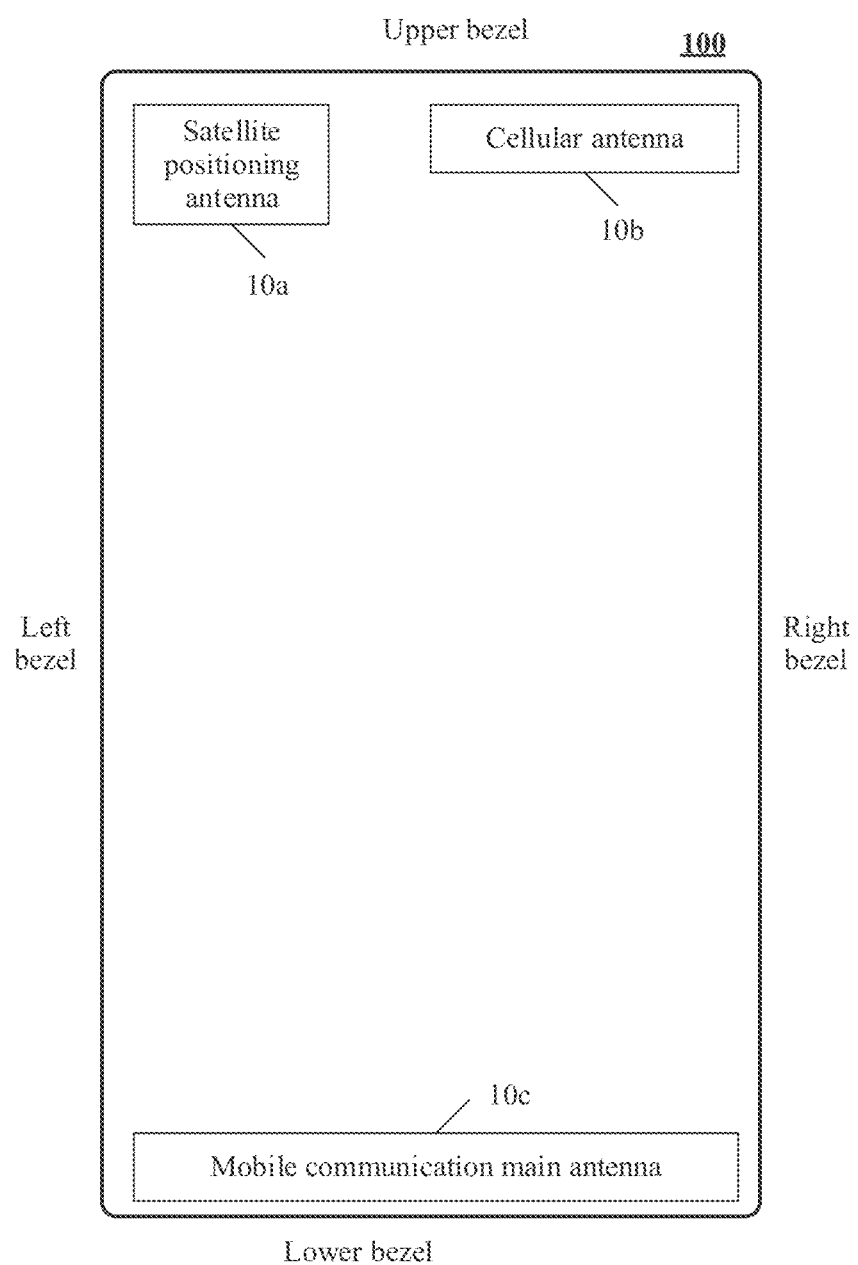
FIG. 1A and FIG. 1B each are a schematic diagram of antennas of an electronic device.
Figure 2:
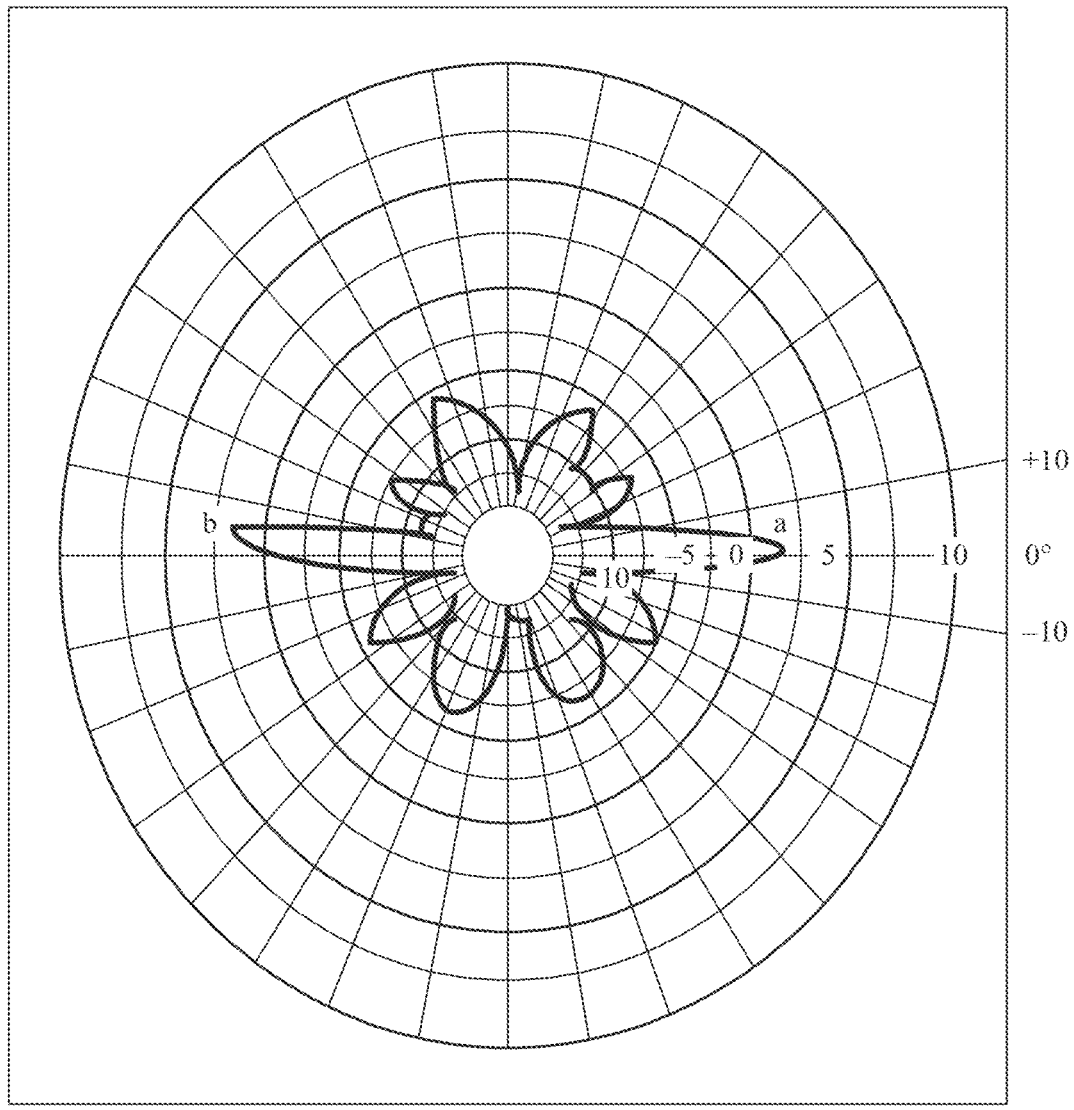
FIG. 2 is an antenna directivity diagram according to an embodiment of this application.

That the antenna faces the sky means that a maximum radiation beam of the antenna is perpendicular to the ground, or an included angle between the maximum radiation beam and the ground is in a first range. That is, a main lobe in an antenna directivity pattern is perpendicular to the ground, or an included angle between the main lobe and the ground is in the first range. The first range may be configured by an electronic device. For example, the first range may be [60°, 120°]. This is not limited herein. The main lobe is the maximum radiation beam on the antenna directivity pattern. For example, FIG. 2 shows the antenna directivity pattern according to an embodiment of this application. ab in FIG. 2 is the main lobe in the antenna directivity pattern. When the main lobe ab is perpendicular to the ground, the antenna faces the sky. A direction of the main lobe ab is parallel to a left bezel and a right bezel of the electronic device 100 in FIG. 1A. A lobe a of the main lobe ab faces an upper bezel or a lower bezel.

(2) Portrait Posture

Figure 3:
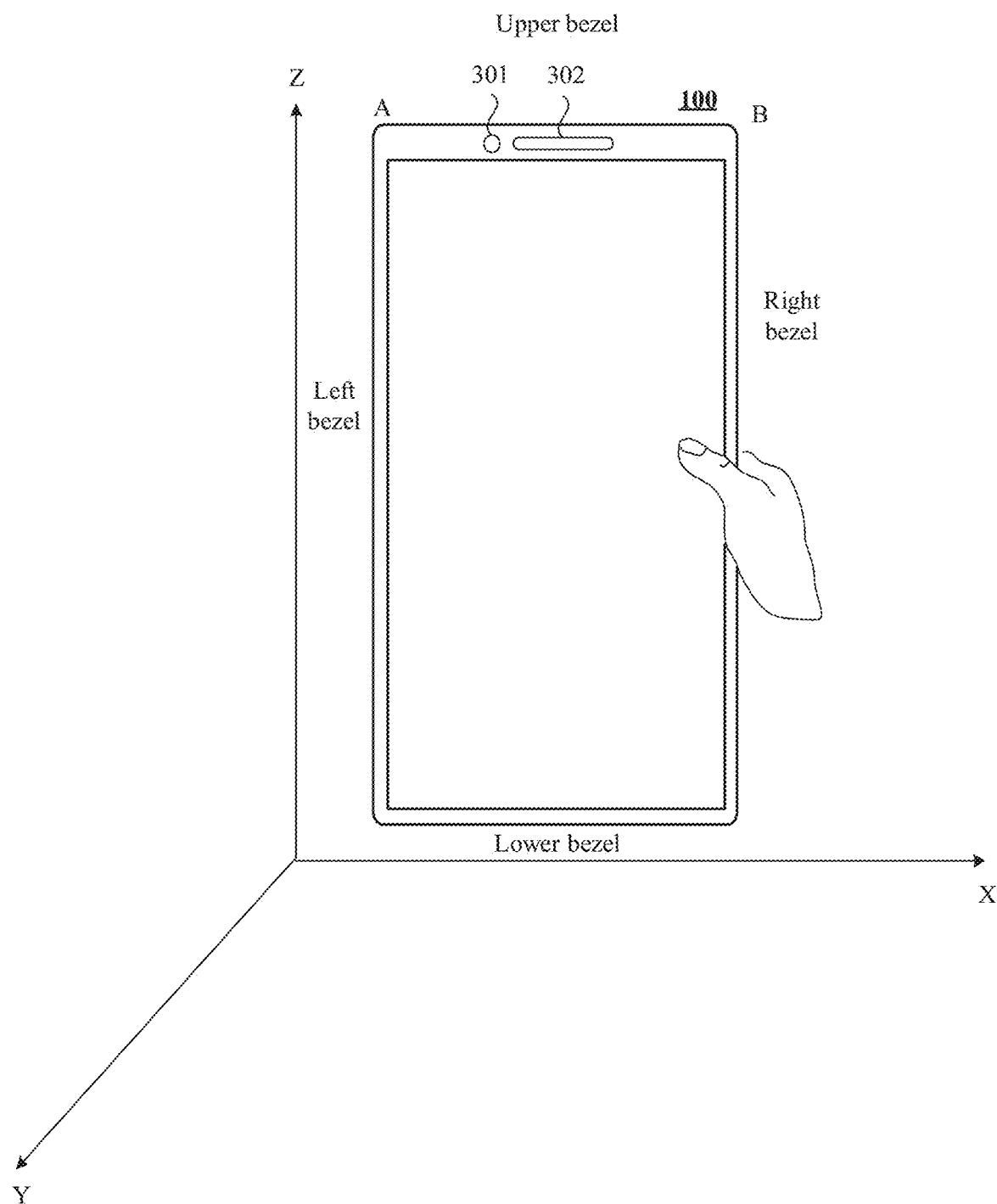
FIG. 3 is a schematic diagram of a portrait posture of an electronic device in an XYZ coordinate system according to an embodiment of this application.

In embodiments of this application, when a first included angle between the upper bezel or the lower bezel of the electronic device and the ground (that is, an XOY plane in a spatial coordinate system XYZ shown in FIG. 3) is less than a first threshold, the electronic device is in the portrait posture. The electronic device may obtain the first included angle by using a gyroscope sensor. The first threshold is configured by a system of the electronic device. The first threshold may be 10°, 20°, 30°, or the like. This is not limited herein. FIG. 3 is a schematic diagram of an electronic device in the spatial coordinate system XYZ. The electronic device 100 may include a front-facing camera 301 and a loudspeaker 302. In FIG. 3, the electronic device 100 is in the portrait posture. When the upper bezel and the lower bezel of the electronic device 100 are parallel to the XOY plane, and the left bezel and the right bezel of the electronic device 100 are perpendicular to the XOY plane, the electronic device 100 is in the portrait posture. In embodiments of this application, the portrait posture may also be referred to as a portrait mode.

(3) Landscape Posture

In some examples, when a second included angle between the upper bezel or the lower bezel of the electronic device and the XOY plane in the spatial coordinate system XYZ is greater than a second threshold or the upper bezel or the lower bezel of the electronic device is parallel to a display direction of a user interface, the electronic device is in the landscape posture. The electronic device may obtain the second included angle by using the gyroscope sensor. The second threshold is configured by the system of the electronic device. The second threshold may be 45°, 60°, 70°, or the like. This is not limited herein.

In some embodiments, when the electronic device 100 receives an operation that a user enables a preset application, for example, a game application or a video application, the electronic device 100 may display a landscape interface. In some embodiments, when some applications are displayed in a landscape mode, the applications are usually displayed in a full screen mode.

In some embodiments, the electronic device 100 may perform landscape display or portrait display based on data of a sensor, for example, may determine by using the gyroscope sensor or an acceleration sensor.

Figure 4:
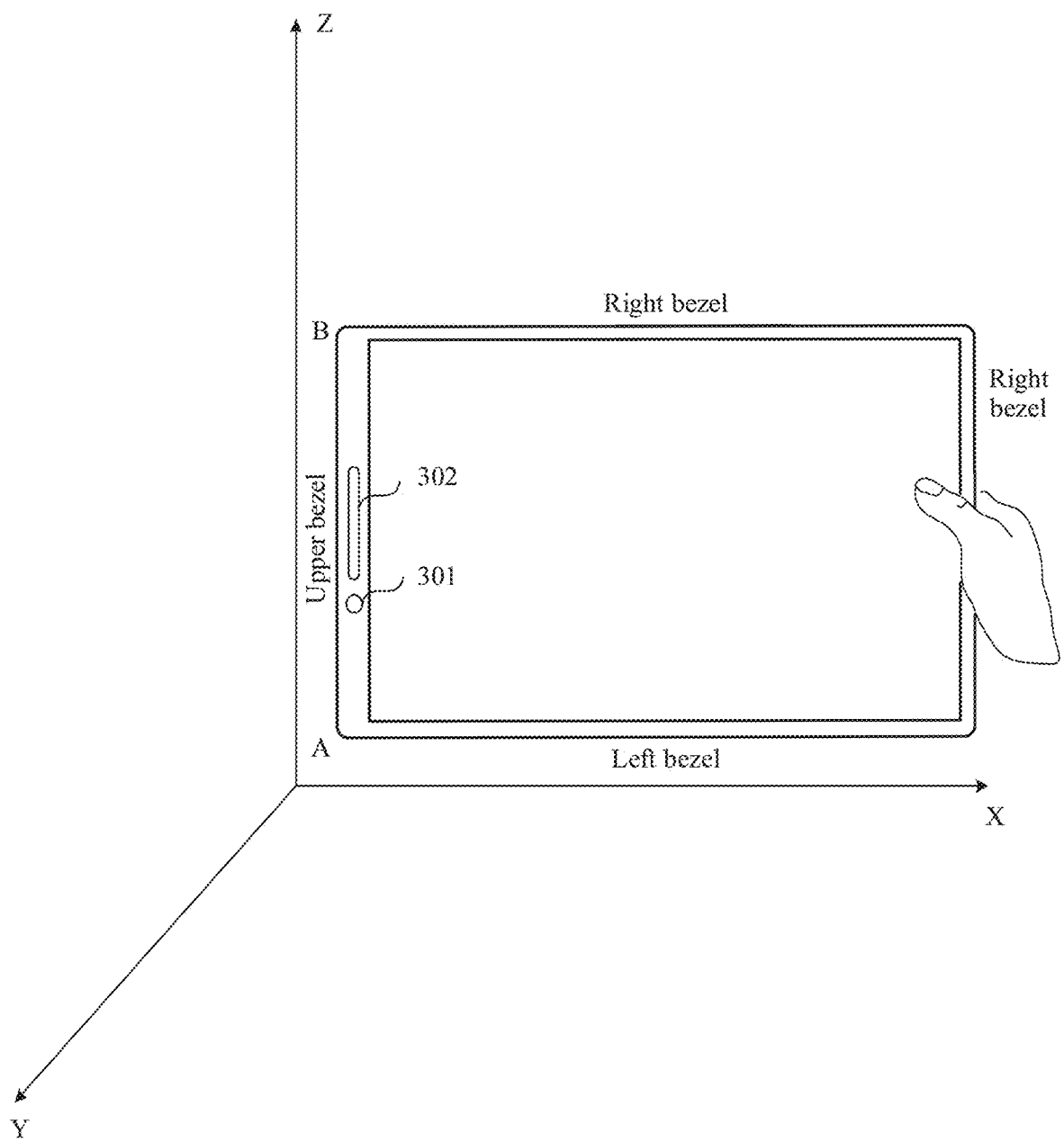
FIG. 4 is a schematic diagram of a landscape posture of an electronic device in an XYZ coordinate system according to an embodiment of this application.

FIG. 4 is a schematic diagram of an electronic device in the spatial coordinate system XYZ. The electronic device 100 in FIG. 4 is in the landscape posture. When the upper bezel and the lower bezel of the electronic device 100 are perpendicular to the XOY plane, and the left bezel and the right bezel of the electronic device 100 are parallel to the XOY plane, the electronic device 100 is in the landscape posture.

Figure 5A:
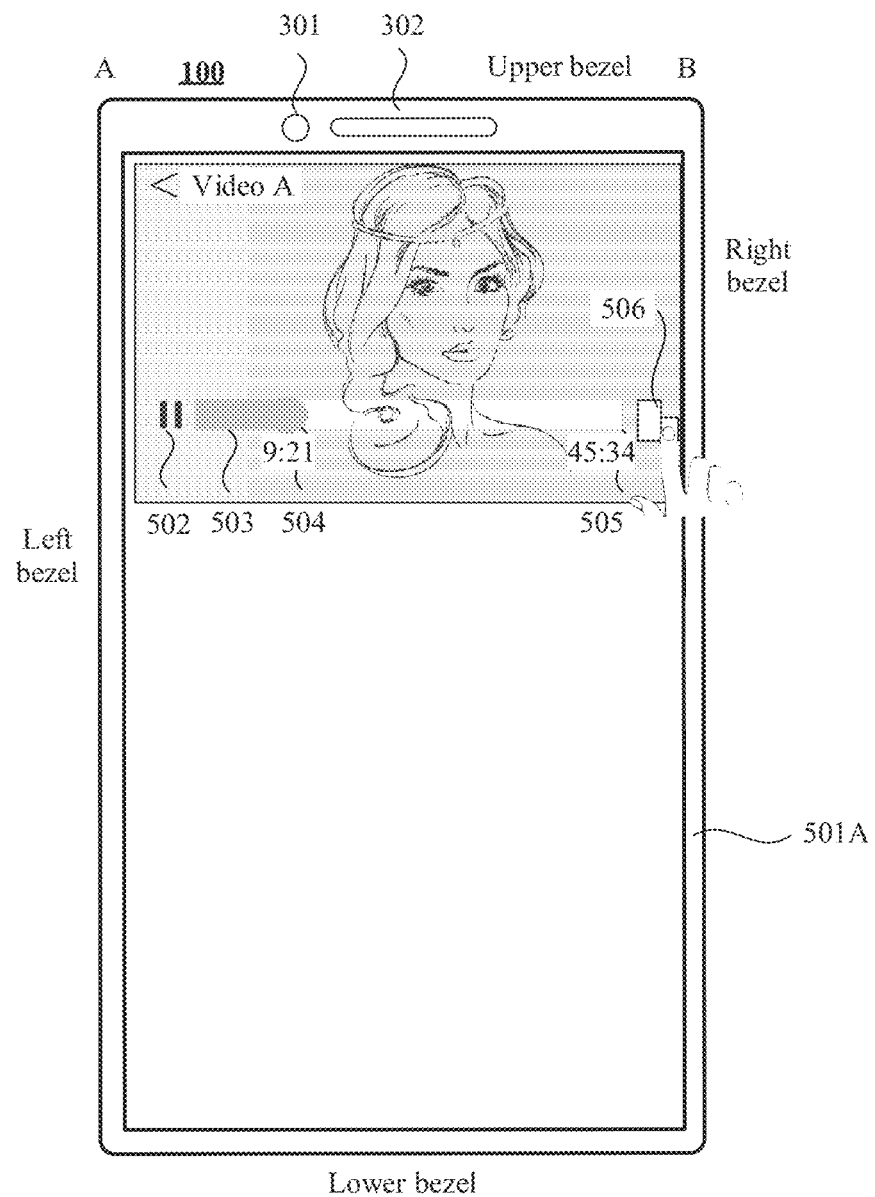
FIG. 5A and FIG. 5B each are a schematic diagram of a user interface of an electronic device in a landscape posture according to an embodiment of this application.

In some other examples, the electronic device may determine, based on a user operation detected on the user interface, that the electronic device is in the landscape posture. For example, the user may tap a control 506 in a video playback interface 501A shown in FIG. 5A, and the control 506 is used to switch a display manner of a user interface 501. As shown in FIG. 5A, the video playback interface may include a playback control 502, a progress bar 503, a current playback time 504, video duration 505, and the control 506. The playback control 502 is used to control playing or stopping of a video. The progress bar 503 is used to display playback progress of a current video. The current playback time 504 is used to display how many minutes the video is currently played (for example, the current video is played to 9 minutes and 21 seconds). The video duration 505 is used to display total duration of the video (for example, 45 minutes and 34 seconds). After the user taps the control 506, the electronic device may display a user interface 50B shown in FIG. 5B. The user interface 501B is a video playback interface displayed in the full screen mode.

Figure 5B:
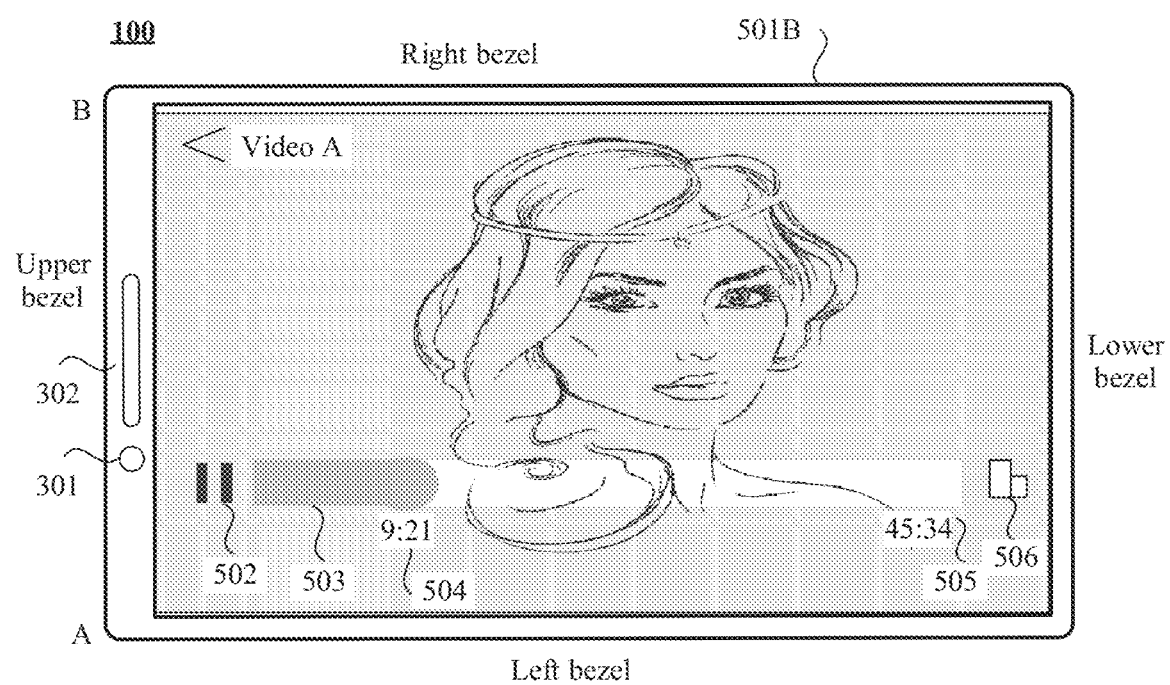

In FIG. 5B, the electronic device 100 is in the landscape posture. The electronic device 100 in FIG. 5B displays the user interface 501B. A display direction of the user interface 501B is parallel to a side AB on which the front-facing camera 301 and the loudspeaker 302 are located.

In embodiments of this application, the landscape posture may also be referred to as a landscape mode.

Figure 6:
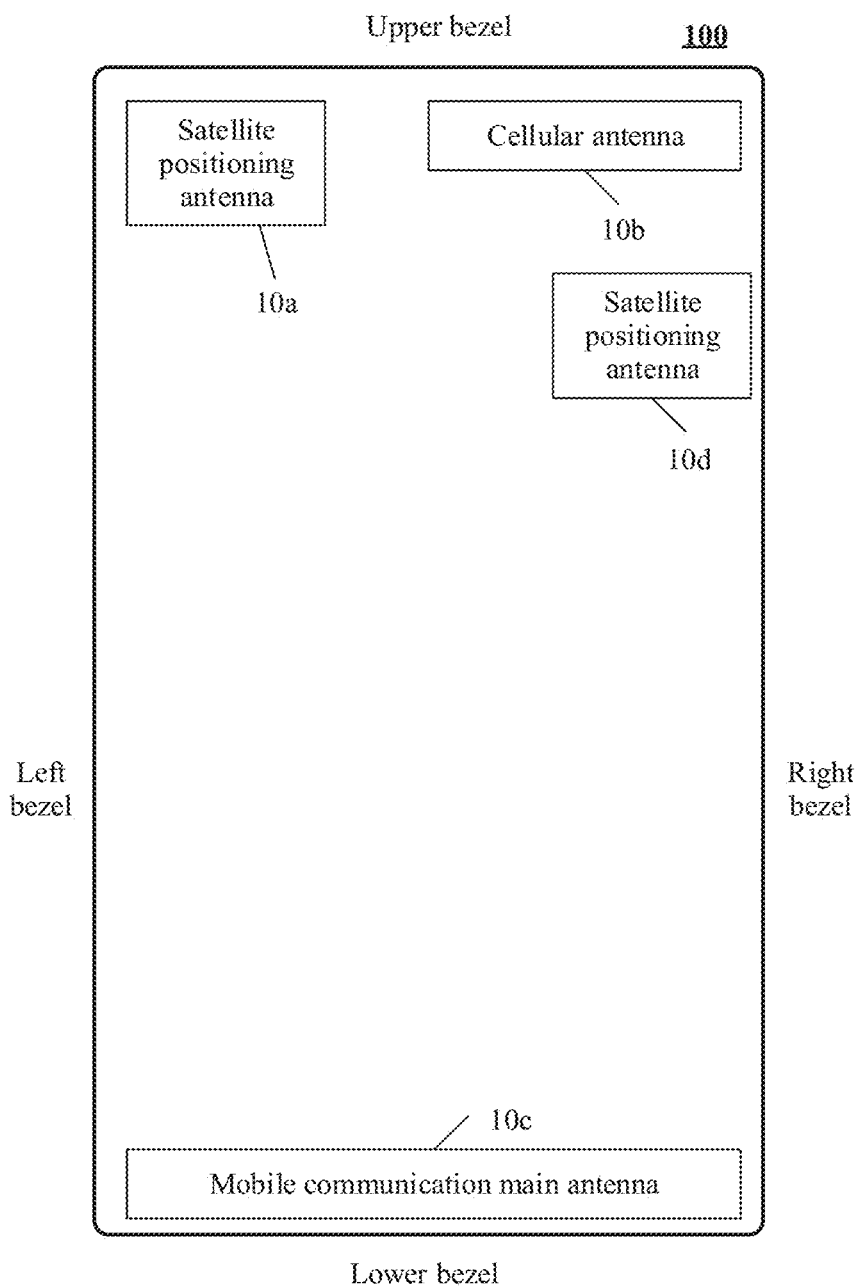
FIG. 6 is a schematic diagram of antennas in an electronic device according to an embodiment of this application.

FIG. 6 is a schematic diagram of placement of a satellite positioning antenna of the electronic device according to an embodiment of this application.

This application provides the electronic device to improve positioning accuracy of the electronic device in the landscape posture. As shown in FIG. 6, the electronic device may include two satellite positioning antennas, including a satellite positioning antenna 10a and a satellite positioning antenna 10d. The satellite positioning antenna 10a is a vertical antenna in embodiments of this application, and may also be referred to as a first antenna. The satellite positioning antenna 10d is a horizontal antenna in embodiments of this application, and may also be referred to as a second antenna. A direction of a main lobe of an antenna directivity pattern of the satellite positioning antenna 10a may be consistent with a direction from the upper bezel to the lower bezel of the electronic device. A direction of a main lobe of an antenna directivity pattern of the satellite positioning antenna 10d may be consistent with a direction from the left bezel to the right bezel of the electronic device.

Based on the electronic device provided in embodiments of this application, an embodiment of this application provides a positioning method. Before positioning, the electronic device may determine, with reference to a placement posture of the electronic device and based on one or more factors such as quantities of satellites respectively received by the vertical antenna (which may be referred to as a first antenna) and the horizontal antenna (which may be referred to as a second antenna), quality of satellite signals respectively received by the vertical antenna and the horizontal antenna, and the like, a used antenna with an optimal positioning effect during positioning of the electronic device. In this way, the positioning accuracy of the electronic device in the landscape posture can be improved.

In this embodiment of this application, the satellite positioning antenna 10a and the satellite positioning antenna 10d are dual-band antennas that support L1 and L5. That is, the satellite positioning antenna 10a and the satellite positioning antenna 10d may receive a carrier signal L1 and a carrier signal L2.

The following describes the positioning method provided in the embodiment of this application.

In some application scenarios, when the electronic device is in the landscape posture, the electronic device may select, based on factors such as the quantities of satellites respectively received by the vertical antenna (which may be referred to as the first antenna) and the horizontal antenna (which may be referred to as the second antenna), the quality of satellite signals respectively received by the vertical antenna and the horizontal antenna, and the like, the vertical antenna or the horizontal antenna to receive a satellite signal.

Then, the electronic device performs positioning based on the satellite signal received by the vertical antenna or the horizontal antenna.

Figure 7:
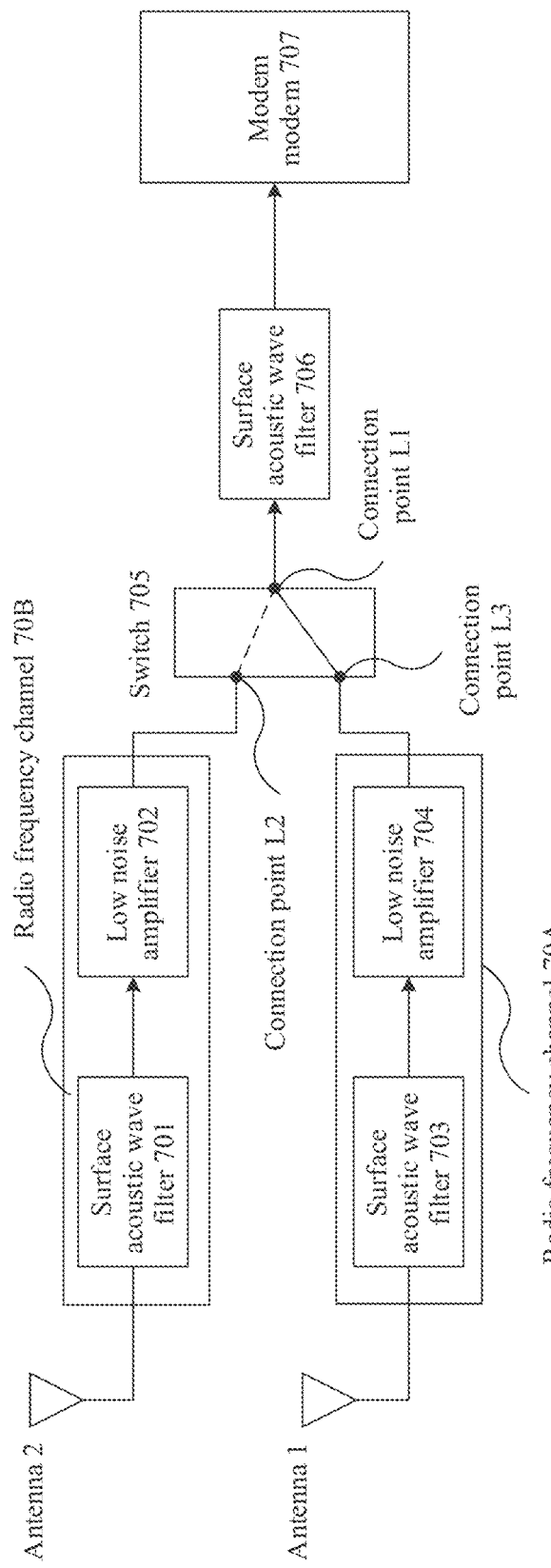
FIG. 7 is a schematic diagram of a circuit for receiving a satellite signal according to an embodiment of this application.

For example, FIG. 7 is a schematic diagram of a circuit for receiving a satellite signal in the electronic device according to an embodiment of this application. As shown in FIG. 7, in the schematic diagram of the circuit, the circuit for receiving the satellite signal may include an antenna 1, an antenna 2, a radio frequency channel 70A, a radio frequency channel 70B, and a switch (switch) 705, a surface acoustic wave filter 706, and a modem modem 707. The switch 705 may include a connection point L1, a connection point L2, and a connection point L3.

The antenna 1 is configured to receive a satellite signal M1 when the connection point L1 in the switch 705 is connected to the connection point L3. The antenna 1 herein may correspond to the satellite positioning antenna 10a described above, and is also referred to as a vertical antenna.

The antenna 2 is configured to receive a satellite signal N1 when the connection point L1 in the switch 705 is connected to the connection point L2. The antenna 2 herein may correspond to the satellite positioning antenna 10d described above, and is also referred to as a horizontal antenna.

The radio frequency channel 70A is used to transmit a satellite signal received by the antenna 1.

In a possible implementation, the radio frequency channel 70A may include a surface acoustic wave (suffice acoustic wave, SAW) filter 703 and a low noise amplifier (low noise amplifier, LNA) 704.

The surface acoustic wave filter 703 is configured to filter out a high-order harmonic wave in the satellite signal M1 received by the antenna 1, to obtain a satellite signal M2.

The low noise amplifier 704 is configured to amplify a satellite signal N2 to obtain a satellite signal N3.

The radio frequency channel 70B is used to transmit a satellite signal received by the antenna 2. The radio frequency channel 70B may include a surface acoustic wave filter 701 and a low noise amplifier 702.

The surface acoustic wave filter 701 is configured to filter out a high-order harmonic wave in the satellite signal N1 received by the antenna 2, to obtain a satellite signal N2.

The low noise amplifier 702 is configured to amplify the satellite signal M2 to obtain a satellite signal M3.

The switch 705 is configured to select the antenna 1 or the antenna 2 to receive a satellite signal.

In a possible implementation, the switch 705 may receive a control instruction sent by a wireless communication module in the electronic device. The control instruction may be used to control the connection point L1 of the switch 705 to be connected to the connection point L2, or to be connected to the connection point L3. In this way, the antenna 1 or the antenna 2 is selected to receive the satellite signal.

In a possible implementation, the switch 705 may receive a control instruction sent by an application processor in the electronic device. The control instruction may be used to control the connection point L1 of the switch 705 to be connected to the connection point L2, or to be connected to the connection point L3. In this way, the antenna 1 or the antenna 2 is selected to receive the satellite signal.

The surface acoustic wave filter 706 is configured to filter out a noise signal in the satellite signal. When the connection point L1 and the connection point L3 in the switch 705 are connected, the surface acoustic wave filter 706 is configured to filter out a noise signal in the satellite signal M3 to obtain a satellite signal M4. When the connection point L1 and the connection point L2 in the switch 705 are connected, the surface acoustic wave filter 706 is configured to filter out a noise signal in the satellite signal N3 to obtain a satellite signal N4.

The modem 707 is configured to demodulate a satellite signal. In some examples, the modem 707 may be further configured to modulate and demodulate a Wi-Fi signal and a Bluetooth signal.

In some examples, the circuit for receiving the satellite signal in the electronic device may not include the surface acoustic wave filter 706. It may be understood that components in the circuit for receiving the satellite signal in the electronic device in this embodiment of this application may be greater than or less than the components shown in FIG. 7. This is not limited in this application.

In this embodiment of this application, the switch 705 may be referred to as a path selection module.

In this embodiment of this application, the satellite signal M1 may be referred to as a first satellite signal. The satellite signal N1 may be referred to as a second satellite signal. A satellite signal W may be referred to as a third satellite signal. The satellite signal M4 may be obtained through signal processing on the first satellite signal. The satellite signal N4 may be obtained through signal processing on the second satellite signal.

Based on the foregoing schematic diagram of the circuit, an embodiment of this application provides a positioning method.

Figure 8A:
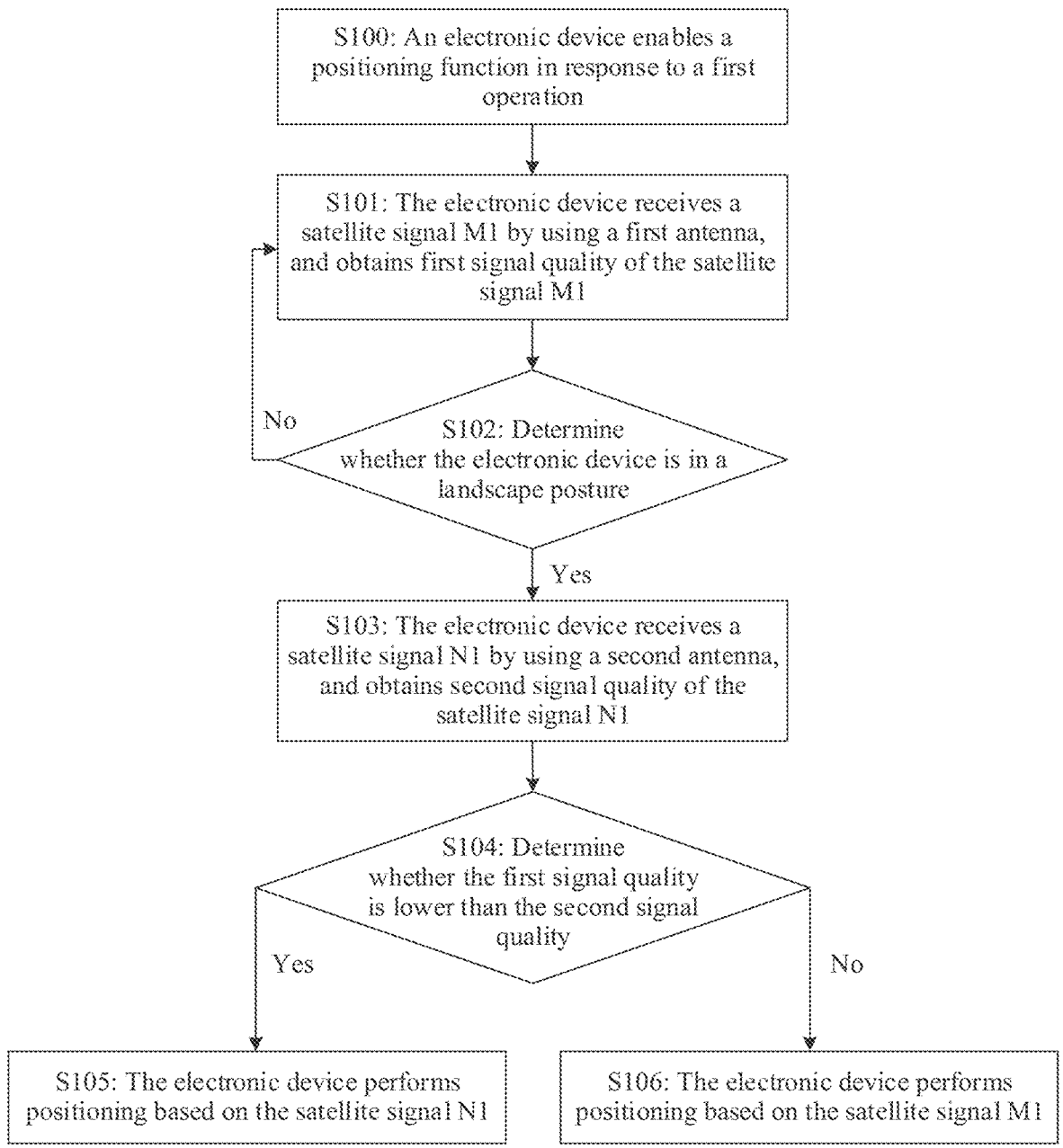
FIG. 8A is a schematic flowchart of a positioning method according to an embodiment of this application.

The positioning method provided in this embodiment of this application is described below in detail with reference to FIG. 8A. FIG. 8A is a schematic flowchart of a positioning method according to an embodiment of this application. As shown in FIG. 8A, the positioning method provided in this embodiment of this application may include the following steps.

S100: The electronic device enables a positioning function in response to a first operation.

Figure 9:
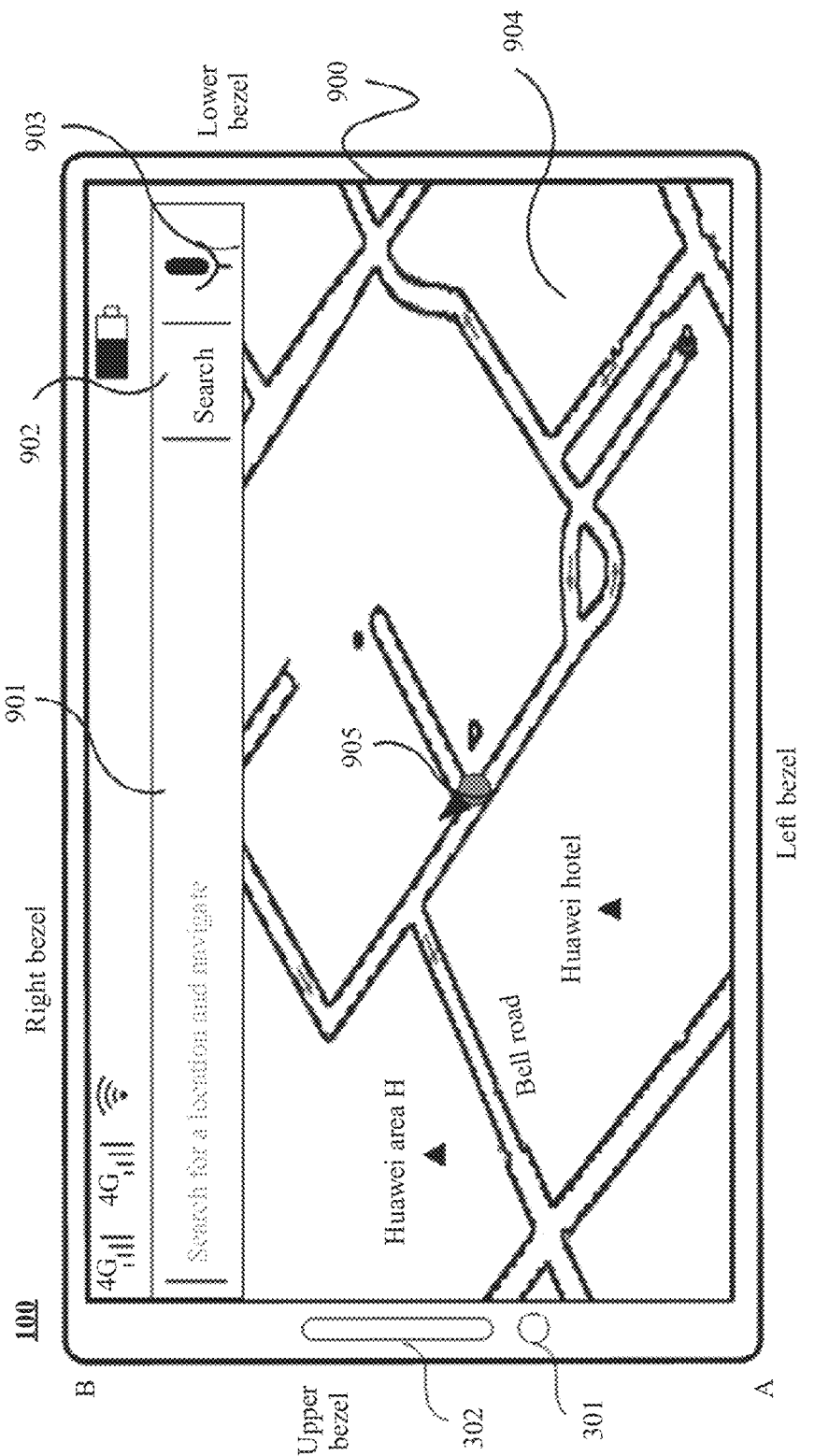
FIG. 9 is a schematic diagram of a map application interface according to an embodiment of this application.

There may be a plurality of first operations in this embodiment of this application. For example, a user enables GPS positioning in the electronic device, or a user enables a map application to search for a destination location on a map application interface, or a user taps a GPS switch in a status bar. This is not limited herein. For example, the map application interface may be a map application interface 900 shown in FIG. 9. The map application interface 900 may include a destination search box 901, a search control 902, a voice input control 903, a map 904, and a location marker 905. The destination search box 531 may be used to receive a destination name entered by the user. The search control 902 is used to trigger displaying, on the map 904, a location corresponding to the destination name in the destination search box 901. The voice input control 903 is used to trigger receiving a destination name entered by the user through voice input. The location marker 905 may be used to indicate a location of the electronic device 100 on the map 904. The electronic device 100 in FIG. 9 is in a landscape posture.

The electronic device may enable the positioning function in response to the first operation. That is, after the electronic device receives the first operation, the electronic device may enable modules of the electronic device that participate in positioning, for example, an antenna and a satellite positioning chip.

The user may perform positioning by using the electronic device, and the electronic device has the positioning function. The electronic device may determine a location of the electronic device by using a satellite positioning technology. For specific details of performing positioning by the electronic device by using the satellite positioning technology, refer to the conventional technology. Details are not described herein. The electronic device may further determine the location of the electronic device based on a base station positioning technology and a Wi-Fi technology. For how the electronic device performs positioning by using the base station positioning technology and the Wi-Fi positioning technology, refer to descriptions of base station positioning and Wi-Fi positioning in the conventional technology. Details are not described herein again. The electronic device may further determine the location of the electronic device by using a base station-assisted satellite positioning technology. For how the electronic device performs positioning by using the base station-assisted satellite positioning technology, refer to the conventional technology, Details are not described herein again. In embodiments of this application, an example in which the electronic device performs positioning by using the satellite positioning technology is used below for description.

Generally, when the electronic device is indoors, the electronic device may perform positioning by using a positioning technology such as Wi-Fi, Bluetooth, or ultra-wideband (ultra wide band, MB) (narrowband). When the electronic device is outdoors, the electronic device may perform positioning by using the satellite positioning technology.

S101: The electronic device receives the satellite signal M1 by using the first antenna, and obtains first signal quality of the satellite signal M1.

Figure 1B:
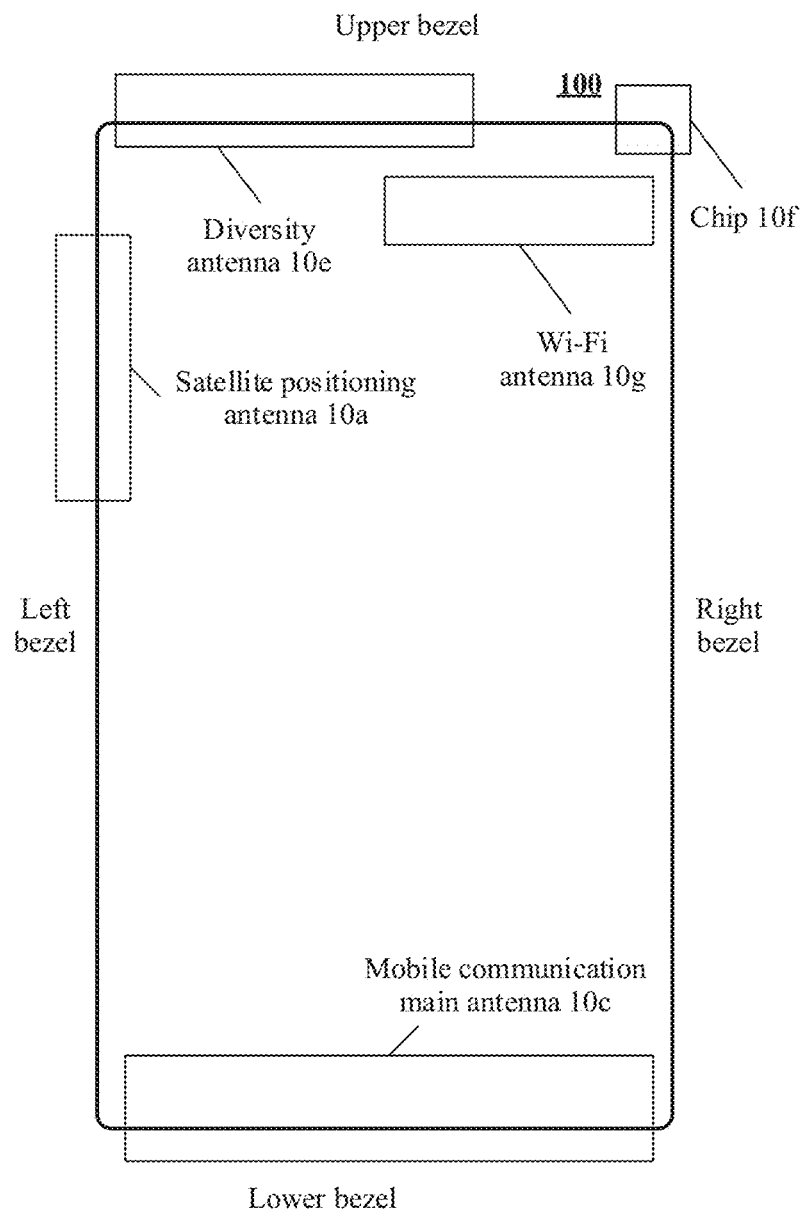

The electronic device receives a satellite signal by using the first antenna. In this embodiment of this application, the first antenna is the antenna 10a shown in FIG. 1A, FIG. 1B, and FIG. 6 and the antenna 1 shown in FIG. 7, and may also be referred to as a vertical antenna. It may be understood that, only when the connection point L1 and the connection point L3 of the switch 705 shown in FIG. 7 are connected, the electronic device can receive a satellite signal of a satellite by using the first antenna. The first antenna may receive satellite signals of a plurality of satellites. At different times and different places, quantities of satellites whose satellite signals can be received by the first antenna may be different. Quality of satellite signals of the plurality of satellites received by the first antenna may also be different. It may be understood that a larger quantity of satellites that can be found by the electronic device indicates higher quality of a received satellite signal and higher positioning precision of the electronic device. Herein, there may be a plurality of parameters for measuring satellite signal quality, for example, a carrier-to-noise ratio (carrier-to-noise ratio, C/N) and a signal-to-noise ratio (signal noise ratio, SNR), a received signal strength indication (received signal strength indication, RSSI), reference signal received power (reference signal receiving power, RSRP), and reference signal received quality (reference signal receiving quality, RSRQ). This is not limited herein. A larger C/N value indicates higher signal quality of the satellite signal. A larger SNR value indicates higher quality of the satellite signal. An RSSI in a receive end (for example, the electronic device 100) is generally a negative value, and a smaller RSSI value indicates higher quality of a signal received by the receive end. The following uses an example in which a value of the SNR is used to measure signal quality of a satellite signal for description.

It may be understood that the satellite signal M1 may include satellite signals transmitted by a plurality of satellites. That is, M1 may be a set of a plurality of satellite signals. For example, M1 is (M11, M12, M13, . . . , M1m). Herein, m is a quantity of satellites that can be found by the first antenna. The first signal quality of the satellite signal M1 is corresponding to signal quality of satellite signals of a plurality of satellites received by the first antenna.

For example, Table 1 shows satellite IDs that can be found by the first antenna: "6", "16", "21", "23", "31", "73", "76", "78", "83", "84", and "86". The first antenna may receive satellite signals sent by satellites corresponding to the satellite IDs. A signal-to-noise ratio (signal noise ratio, SNR) in Table 1 may be used to measure signal quality of the satellite signal received by the first antenna. A larger value of the SNR indicates better signal quality of the satellite signal received by the first antenna. It may be understood that quantities of satellites found by different electronic devices or an electronic device at different times or locations may be different from those shown in Table 1. The SNR of the satellite signal may also be different from that shown in Table 1. Table 1 is merely an example for describing a satellite found by the first antenna and an SNR of a satellite signal, and does not impose a limitation.

TABLE 1

| Satellite ID | SNR |
| --- | --- |
| 6 | 38.0 |
| 16 | 38.1 |
| 21 | 38.1 |
| 23 | 15.6 |
| 31 | 36.2 |
| 73 | 35.8 |
| 76 | 35.6 |
| 78 | 26.2 |
| 83 | 34.9 |
| 84 | 21.9 |
| 86 | 34.3 |

For example, the electronic device may perform signal processing on the satellite signal received by the first antenna. The electronic device may filter out, by using a first surface acoustic wave (surface acoustic wave, SAW) filter (for example, the surface acoustic wave filter 703 in FIG. 7), a high-order harmonic wave in the satellite signal M1 received by the first antenna, to obtain the satellite signal M2. Then, the electronic device may amplify the satellite signal M2 by using a low noise amplifier (low noise amplifier, LNA) (for example, the low noise amplifier 704 in FIG. 7), to obtain the satellite signal M3. The electronic device may perform signal processing on the satellite signal by using a plurality of methods, for example, perform, by using a high-pass filter or another algorithm, signal processing on the satellite signal received by the first antenna. A specific signal processing manner is not limited in this application. In this way, the signal quality of the satellite signal M1 can be improved, and the electronic device can perform positioning more accurately.

Herein, in a portrait posture, the electronic device receives the satellite signal by using the first antenna, and the second antenna does not receive the satellite signal. That is, in the portrait posture, the first antenna outputs a signal, and the second antenna outputs no signal.

S102: Determine whether the electronic device is in a landscape posture; and if the electronic device is in the landscape posture, the electronic device performs step S103; or if the electronic device is not in the landscape posture, the electronic device performs step S101.

The electronic device may be in the portrait posture, or may be in the landscape posture. In a process in which the electronic device performs satellite positioning, the user may switch the electronic device to the landscape posture.

For example, the user may switch the electronic device in the portrait posture shown in FIG. 4 to the landscape posture shown in FIG. 5B. When the user changes a posture of holding the electronic device by a hand, the electronic device may detect, by using a gyroscope and/or a gravity sensor, that the posture of the electronic device is the landscape posture. The electronic device may further detect the posture of the electronic device by using a posture sensor. Alternatively, the electronic device determines, based on a detected user operation, that the electronic device is in the landscape posture. For example, the electronic device shown in FIG. 9 is in the landscape posture.

When the electronic device determines that the electronic device is in the landscape posture, the electronic device may switch the connection point L1 of the switch 705 shown in FIG. 7 to the connection point L2. In this case, the second antenna may receive a satellite signal.

When the electronic device determines that the electronic device is in the landscape posture, the electronic device performs step S104. If the electronic device is in the portrait posture, the electronic device performs step S101.

It may be understood that there may be no sequence relationship between step S101 and step S102, that is, the electronic device may simultaneously perform step S101 and step S102.

S103: The electronic device receives the satellite signal N1 by using the second antenna, and obtains second signal quality of the satellite signal N1.

Only when the connection point L1 and the connection point L2 in the switch 705 shown in FIG. 7 are connected, the electronic device receives the satellite signal by using the second antenna. The second antenna may be the satellite positioning antenna 10d in FIG. 6 and the antenna 2 shown in FIG. 7, and may also be referred to as a horizontal antenna. It may be understood that before step S104 is performed, the electronic device may already connect the connection point L1 and the connection point L2 in the switch 705.

It may be understood that the satellite signal N1 may include satellite signals transmitted by a plurality of satellites. That is, N1 may be a set of a plurality of satellite signals, for example, (N11, N12, N13, . . . , N1n). Herein, n is a quantity of satellites that can be found by the second antenna. The second signal quality is corresponding to signal quality of satellite signals of a plurality of satellites received by the second antenna.

For example, Table 2 shows satellite IDs that can be found by the second antenna: "6", "16", "21", "23", "31", "73", "76", "83", "84", and "86". The second antenna may receive satellite signals sent by satellites corresponding to the satellite IDs. A signal-to-noise ratio (signal noise ratio, SNR) in Table 2 may be used to measure signal quality of a satellite signal received by the second antenna. A larger value of the SNR indicates better signal quality of the satellite signal received by the second antenna. It may be understood that quantities of satellites found by different electronic devices or an electronic device at different times or locations may be different from those shown in Table 2. The SNR of the satellite signal may also be different from that shown in Table 2. Table 2 is merely an example for describing a satellite found by the second antenna and are SNR of a satellite signal, and does not impose a limitation.

TABLE 2

| Satellite ID | SNR |
|---|---|
| 6 | 40.0 |
| 16 | 37.1 |
| 21 | 39.1 |
| 23 | 23.6 |
| 31 | 36.2 |
| 73 | 37.8 |
| 76 | 38.6 |
| 78 | 31.2 |
| 83 | 34.9 |
| 84 | 29.9 |
| 86 | 36.3 |

Figure 8B:
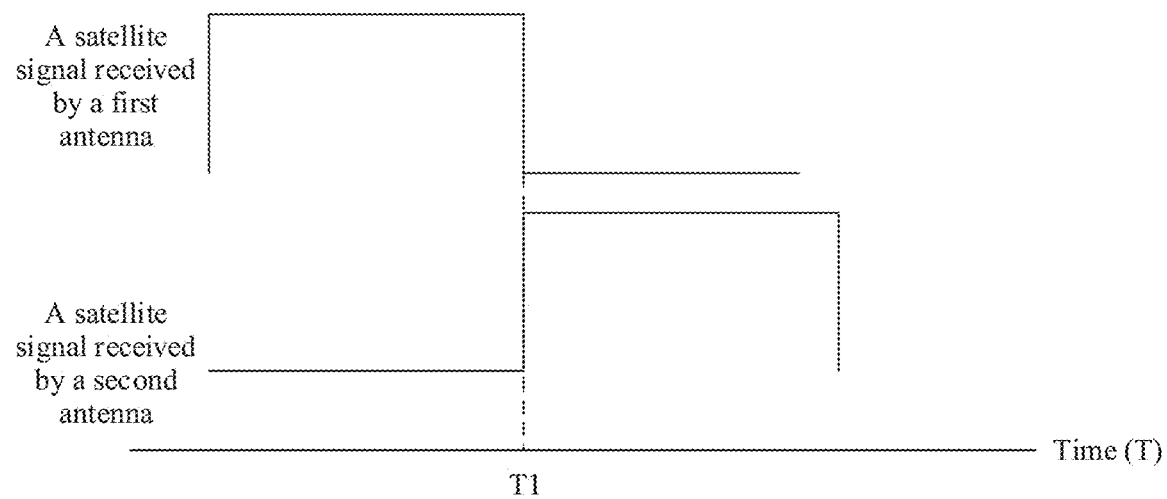
FIG. 8B is a time sequence diagram of receiving satellite signals by a first antenna and a second antenna according to an embodiment of this application.

FIG. 8B is a time sequence diagram of receiving satellite signals by the first antenna and the second antenna. In FIG. 8B, the electronic device is in a landscape posture at a moment T1. Before the moment T1, the electronic device receives a satellite signal by using the first antenna. At the moment T1, the electronic device receives a satellite signal by using the second antenna.

S104: The electronic device determines whether the first signal quality of the satellite signal M1 is lower than the second signal quality of the satellite signal N1; and if the first signal quality of the satellite signal M1 is lower than the second signal quality of the satellite signal N1, the electronic device performs step S105; or if the first signal quality of the satellite signal M1 is not lower than the second signal quality of the satellite signal N1, the electronic device performs step S106.

In a possible implementation, the electronic device may determine whether the signal quality of the satellite signal M1 is lower than the signal quality of the satellite signal N1 based on whether a quantity of satellites whose SNRs of the satellite signal M1 are greater than a first threshold is less than a quantity of satellites whose SNRs of the satellite signal N1 are greater than the first threshold. For example, as shown in Table 1, the quantity of satellites found by the first antenna is 11, and a quantity of satellites whose SNRs of the satellite signals are greater than 30 is 8. A quantity of satellites found by the second antenna is 11, where a quantity of satellites whose SNRs of the satellite signals are greater than 30 is 9. In this case, the electronic device may determine that the signal quality of the satellite signal M1 is lower than the signal quality of the satellite signal N1.

Further, if the quantity of satellites whose SNRs of the satellite signals received by the first antenna are greater than the first threshold is equal to the quantity of satellites whose SNRs of the satellite signals received by the second antenna are greater than the first threshold, the electronic device may compare magnitudes of SNRs of signals from a same satellite that are received by the first antenna and the second antenna. For example, if the quantity of satellites found by the first antenna is 11 (satellite IDs are 1 to 11 respectively), where the quantity of satellites whose SNRs of the satellite signals are greater than 30 is 8, and the quantity of satellites found by the second antenna is 11, where the quantity of satellites whose SNRs of the satellite signals are greater than 30 is 8, the electronic device may compare SNRs of satellite signals of a satellite 1 received by the first antenna and the second antenna, SNRs of satellite signals of a satellite 2 received by the first antenna and the second antenna, and the like, and compare SNRs of satellite signals of 11 satellites received by the first antenna and the second antenna at a time. If a quantity of satellites whose SNRs of the satellite signals of the satellites received by the first antenna is less than SNRs of the satellite signals of the satellites received by the second antenna exceeds a quantity of satellites whose SNRs of the satellite signals of the satellites received by the first antenna is greater than the SNRs of the satellite signals of the satellites received by the second antenna, the electronic device determines that signal quality of the satellite signals received by the first antenna is lower than signal quality of the satellite signals received by the second antenna.

In a possible implementation, when the first signal quality is equal to the second signal quality, the electronic device may receive a satellite signal by using the second antenna. In this way, the switch 705 in FIG. 7 is prevented from switching to a state in which the first antenna can receive the satellite signal. That is, the connection point L1 of the switch 705 can be prevented from being switched from the connection point L2 to the connection point L3. In this way, power consumption of the electronic device can be reduced.

The electronic device performs positioning based on the satellite signal N1.

When the signal quality of the satellite signals received by the second antenna is higher than the signal quality of the satellite signals received by the first antenna, the electronic device performs positioning based on the satellite signal N1 received by the second antenna. The electronic device may determine a specific location of the electronic device based on distances between a plurality of satellites at known locations and the electronic device. The locations of the satellites are known. The electronic device receives a satellite signal sent by a first satellite, and may query a location of the first satellite based on a navigation message in the satellite signal. The electronic device may obtain a distance from the first satellite to the electronic device based on time at which the satellite signal of the first satellite is propagated to the electronic device. For determining, by the electronic device, the location of the electronic device based on the satellite signal, refer to the description of positioning the electronic device based on a GPS signal in the conventional technology. Details are not described herein again.

Further, in a possible implementation, when the signal quality of the satellite signal N1 is higher than the signal quality of the satellite signal M1, if the electronic device determines that the signal quality of the satellite signal N1 is greater than a preset threshold, the electronic device performs positioning based on the satellite signal N1. Otherwise, the electronic device performs positioning based on the satellite signal M1. That is, only when the signal quality of the satellite signal received by the second antenna is better, the second antenna is used to receive the satellite signal N1, and positioning is performed based on the satellite signal N1.

In a possible implementation, if a difference between the signal quality of the satellite signal N1 and the signal quality of the satellite signal M1 is less than a first difference threshold, the electronic device performs positioning based on the satellite signal M1. That is, although the quality of the satellite signal received by the second antenna is higher than the quality of the satellite signal received by the first antenna, the difference is small. In this case, the first antenna may still be used to receive the satellite signal.

In a possible implementation, if the difference between the signal quality of the satellite signal N1 and the signal quality of the satellite signal M1 is less than a second difference threshold, the electronic device performs positioning based on the satellite signal M1. When the quality of the satellite signal received by the second antenna is much higher than the quality of the satellite signal received by the first antenna, the electronic device considers that the second antenna is abnormal. The electronic device receives the satellite signal by using the first antenna or prompts an exception.

In a possible implementation, before the electronic device performs positioning based on the satellite signal N1, the electronic device performs signal processing on the satellite signal N1.

For example, the electronic device may perform signal processing on the satellite signal received by the second antenna. The electronic device may filter out, by using a second SAW filter (for example, the surface acoustic wave filter 701 in FIG. 7), a high-order harmonic wave in the satellite signal N1 received by the second antenna, to obtain the satellite signal N2. Then, the electronic device may amplify the satellite signal N2 by using an LNA (for example, the low noise amplifier 702 in FIG. 7), to obtain the satellite signal N3. Here, the electronic device may perform signal processing on the satellite signal by using a plurality of methods, for example, perform, by using a high-pass filter or another algorithm, signal processing on the satellite signal received by the second antenna. A specific signal processing manner is not limited in this application. In this way, the signal quality of the satellite signal N1 can be improved, and the electronic device can perform positioning more accurately.

S106: The electronic device performs positioning based on the satellite signal M1.

When the first signal quality is higher than the second signal quality, the electronic device performs positioning based on the satellite signal received by the first antenna. In this case, the connection point L1 of the switch 705 shown in FIG. 7 is switched from the connection point L2 to the connection point L3. Herein, reference may be made to step S105, and details are not described herein again.

It may be understood that there are two antennas in the electronic device. If the signal quality of the satellite signal received by the first antenna is better, the electronic device may perform positioning based on only the satellite signal received by the first antenna. In this way, the electronic device does not need to process satellite signals received by the two antennas, thereby reducing the power consumption of the electronic device.

The electronic device may display a positioning result. As shown in FIG. 9, the electronic device may display the positioning result on the user interface 900. A location positioned by the electronic device may be at the location marker 905.

In some possible implementations, if the electronic device switches from the landscape posture to the portrait posture when performing positioning based on the satellite signal obtained by the second antenna, the electronic device compares the signal quality of the satellite signal received by the first antenna with the signal quality of the satellite signal received by the second antenna again. If the signal quality of the satellite signal received by the first antenna is higher, the electronic device switches to the first antenna to receive the satellite signal.

In a possible implementation, if the electronic device is switched from the landscape posture to the portrait posture when the electronic device performs positioning based on the satellite signal obtained by the second antenna, the electronic device performs positioning based on the satellite signal obtained by the first antenna. That is, in the electronic device, positioning may be performed based on the satellite signal obtained by the first antenna by default when the portrait posture is set.

In a possible implementation, if the electronic device switches from the landscape posture to the portrait posture when the electronic device performs positioning based on the satellite signal obtained by the second antenna, the electronic device detects the quality of the satellite signal received by the second antenna and if the quality of the satellite signal is greater than a quality threshold, the electronic device performs positioning based on the satellite signal received by the second antenna. In this way, the electronic device does not need to switch from the second antenna to the first antenna, thereby reducing the power consumption.

In the positioning method provided in this embodiment of this application, the first antenna faces the sky in the portrait posture, and the second antenna faces the sky in the landscape posture. When the electronic device is in the landscape posture, the electronic device may choose to perform positioning based on a satellite signal received by an antenna which can find a larger quantity of satellites and receive better signal quality of a satellite signal. In this way, the electronic device can perform positioning more accurately in the landscape posture.

In some other application scenarios, when the electronic device is in the landscape posture, the electronic device may select, based on factors such as the quantities of satellites respectively received by the vertical antenna (which may be referred to as the first antenna) and the horizontal antenna (which may be referred to as the second antenna), the quality of satellite signals respectively received by the vertical antenna and the horizontal antenna, and the like, the vertical antenna or the vertical antenna and the horizontal antenna to receive the satellite signal. Then, the electronic device performs positioning based on the satellite signal received by the vertical antenna or the vertical antenna and the horizontal antenna.

Figure 10:
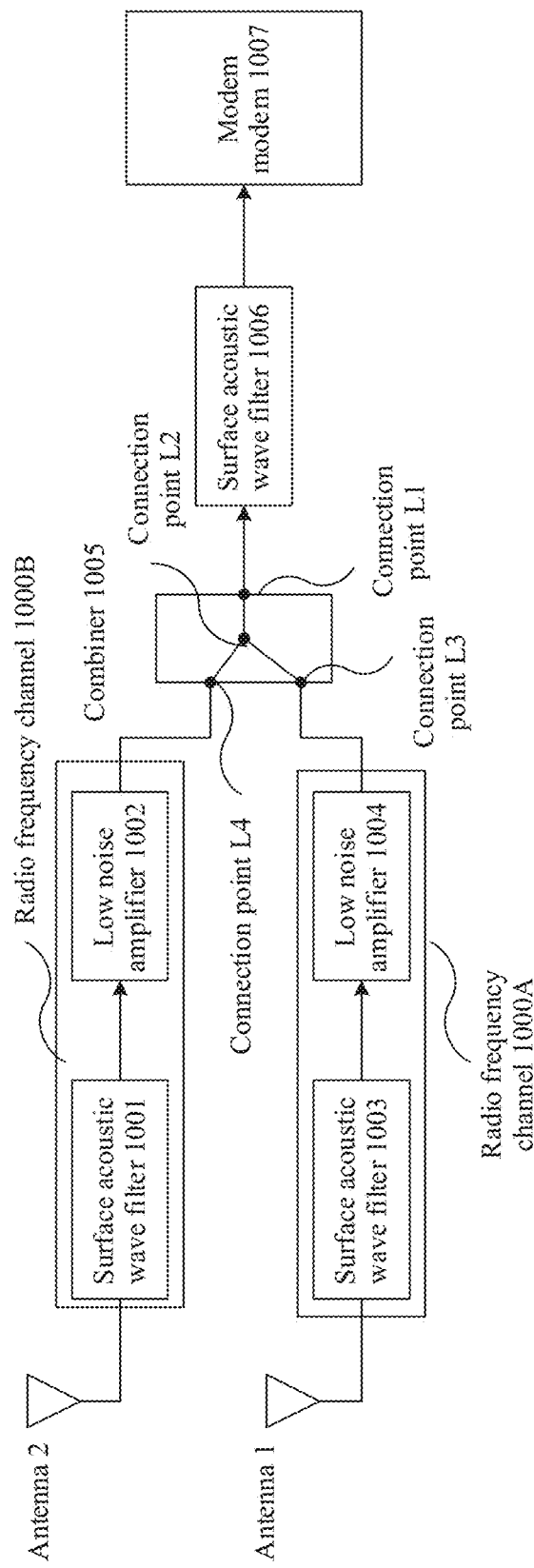
FIG. 10 is a schematic diagram of a circuit for receiving a satellite signal according to an embodiment of this application.

For example, FIG. 10 is a schematic diagram of a circuit for receiving a satellite signal in the electronic device according to an embodiment of this application. In the schematic diagram of the circuit, the circuit for receiving the satellite signal may include an antenna 1, an antenna 2, a radio frequency channel 1000A, a radio frequency channel 1000B, a combiner 1005, a surface acoustic wave filter 1006, and a modem 1007. The combiner 1005 may include a connection point L1 a connection point L2, a connection point L3, and a connection point L4.

The antenna 1 is configured to receive a satellite signal M1 when the connection point L2 in the combiner 1005 is connected to the connection point L4. The antenna 1 may be the satellite positioning antenna 10a in FIG. 6, and may be referred to as a vertical antenna.

The antenna 2 is configured to receive a satellite signal N1 when the connection point L2 in the switch 1005 is connected to the connection point L3. The antenna 2 may be the satellite positioning antenna 10d in FIG. 6, and may be referred to as a horizontal antenna.

The radio frequency channel 1000A is used to transmit a satellite signal received by the antenna 1. The radio frequency channel 1000A may include a surface acoustic wave filter 1003 and a low noise amplifier 1004.

The surface acoustic wave filter 1003 is configured to filter out a high-order harmonic wave in the satellite signal M1 received by the antenna 1, to obtain a satellite signal M2.

The low noise amplifier 1004 is configured to amplify a satellite signal N2 to obtain a satellite signal N3.

The radio frequency channel 1000B is used to transmit a satellite signal received by the antenna 2. The radio frequency channel 1000B may include a surface acoustic wave filter 1001 and a low noise amplifier 1002.

The surface acoustic wave filter 1001 is configured to filter out a high-order harmonic wave in the satellite signal N1 received by the antenna 2, to obtain the satellite signal N2.

The low noise amplifier 1002 is configured to amplify the satellite signal M2 to obtain a satellite signal M3.

The combiner 1005 is configured to select the antenna 1 or the antenna 1 and the antenna 2 to receive a satellite signal. In the combiner 1005, the connection point L1 is connected to the connection point L2. The connection point L2 is always connected to the connection point L3. The connection point L2 and the connection point L4 may be connected or disconnected. In this embodiment of this application, the combiner 1005 may also be referred to as a path selection module.

When the connection point L2 is connected to the connection point L4, both the antenna 1 and the antenna 2 can receive the satellite signal. The combiner 1005 may select a satellite signal with strong signal quality from satellite signals that are of a same satellite and that are separately received by the antenna 1 and the antenna 2 to pass through. For example, if an SNR of a satellite signal of the satellite 1 received by the antenna 1 is 38, an SNR of a satellite signal of the satellite 2 received by the antenna 1 is 28, an SNR of a satellite signal of the satellite 1 received by antenna 2 is 30, and an SNR of a satellite signal of the satellite 2 received by antenna 2 is 31, a satellite signal of the satellite 1 output at the connection point L1 in the combiner 1005 is the satellite signal received by the antenna 1, and a satellite signal of the satellite 2 is the satellite signal received by the antenna 2.

When the connection point L2 and the connection point L4 are disconnected, the antenna 1 may receive the satellite signal, and the antenna 2 does not receive the satellite signal.

The surface acoustic wave filter 1006 is configured to filter out a noise signal in a satellite signal. When the connection point L2 and the connection point L4 in the switch 1005 are disconnected, the surface acoustic wave filter 1006 is configured to filter out a noise signal in the satellite signal M3 to obtain the satellite signal M4. When the connection point L1 and the connection point L2 in the combiner 1005 are connected, the surface acoustic wave filter 1006 is configured to filter out a noise signal in a satellite signal with a higher SNR in the satellite signal N3 and the satellite signal M3, to obtain a satellite signal W.

The modem 707 is configured to demodulate a satellite signal. The modem 1007 may include a location parsing and calculation module, configured to determine location information based on the satellite signal.

In some examples, the circuit for receiving the satellite signal in the electronic device may not include the surface acoustic wave filter 1006. It may be understood that components in the circuit for receiving the satellite signal in the electronic device in this embodiment of this application may be greater than or less than the components shown in FIG. 10. This is not limited in this application.

Based on the foregoing schematic diagram of the circuit, an embodiment of this application provides a positioning method.

Figure 11:
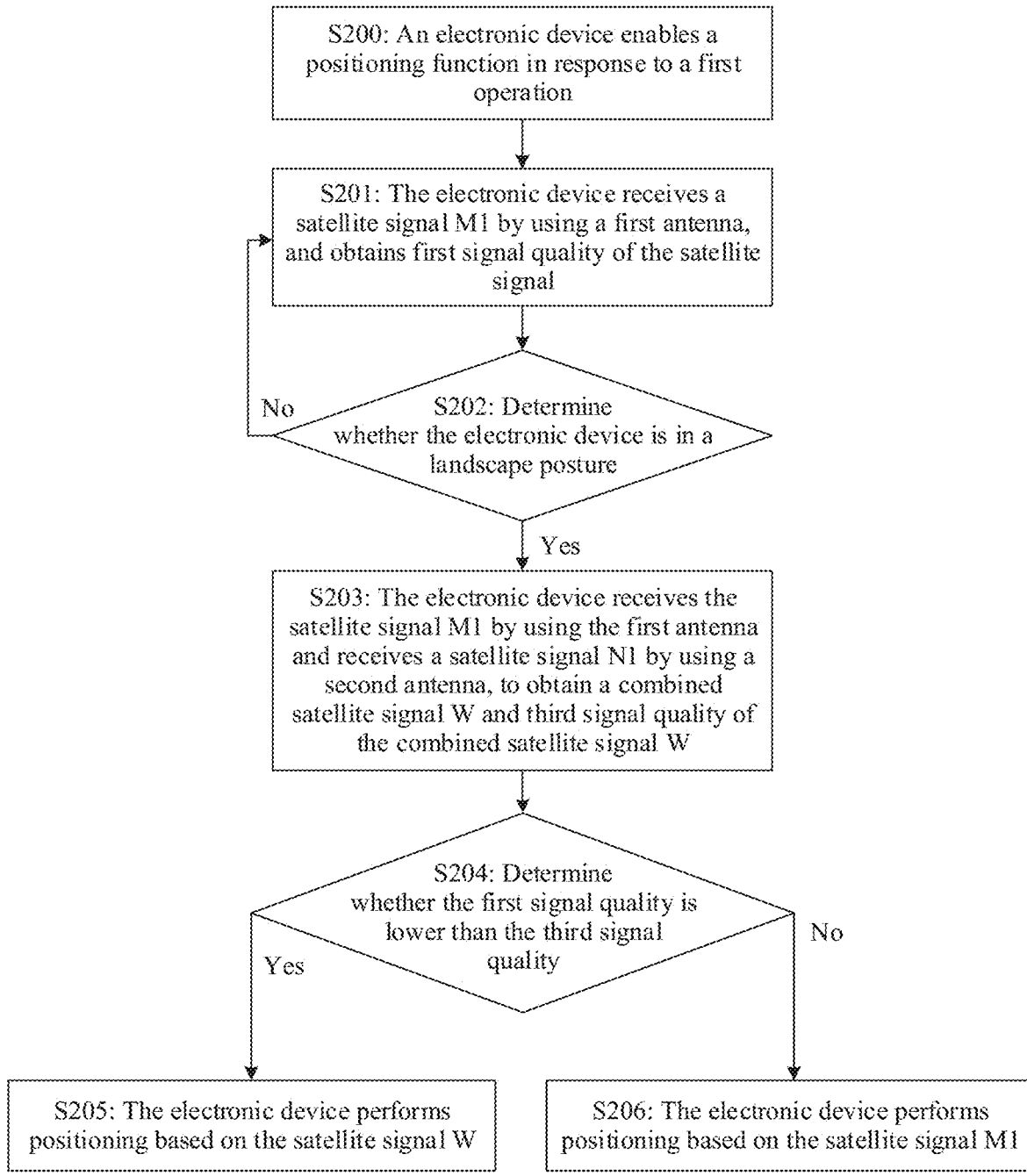
FIG. 11 is a schematic flowchart of a positioning method according to an embodiment of this application.

The positioning method provided in this embodiment of this application is described below in detail with reference to FIG. 11. FIG. 11 is a schematic flowchart of a positioning method according to an embodiment of this application. As shown in FIG. 11, the method in this embodiment of this application may include the following steps.

S200: The electronic device enables a positioning function in response to a first operation.

quality of the satellite signal N11, signal quality of the satellite signal M12 is higher than signal quality of the satellite signal N12, signal quality of the satellite signal M13 is lower than signal quality of the satellite signal N13, signal quality of the satellite signal M14 is lower than signal quality of the satellite signal N14, and signal quality of the satellite signal M15 is higher than signal quality of the satellite signal N15, the combiner 1005 finally performs combination to obtain the satellite signal W, including the satellite signal M11, the satellite signal M12, the satellite signal N13, the satellite signal N14, and the satellite signal M15. For example. Table 3 shows the satellite signal M1 received by the first antenna, the satellite signal N1 received by the second antenna, and the satellite signal W

TABLE 3

| Satellite signal M1 | | Satellite signal N1 | | Satellite signal W | |
|---|---|---|---|---|---|
| Satellite ID | Satellite signal and SNR | Satellite ID | Satellite signal and SNR | Satellite ID | Satellite signal and SNR |
| 1 | M11, SNR = 30 | 1 | N11, SNR = 27.9 | 1 | M11, SNR = 30 |
| 2 | M12, SNR = 31.8 | 2 | N12, SNR = 30.6 | 2 | M12, SNR = 31.8 |
| 3 | M13, SNR = 21.8 | 3 | N13, SNR = 36.8 | 3 | N13, SNR = 36.8 |
| 4 | M14, SNR = 32.4 | 4 | N14, SNR = 35.7 | 4 | N14, SNR = 35.7 |
| 5 | M15, SNR = 35.7 | 5 | N15, SNR = 34.5 | 5 | M15, SNR = 35.7 |

For step S200, refer to step S100. Details are not described herein again.

S201: The electronic device receives the satellite signal 111 by using the first antenna, and obtains first signal quality of the satellite signal M1.

When the connection point L2 and the connection point L4 of the combiner 1005 shown in FIG. 10 are disconnected, the electronic device receives the satellite signal by using the first antenna. The first antenna herein is the antenna 1 shown in FIG. 10. For step S201, refer to step S101. Details are not described herein again.

S202: Determine whether the electronic device is in a landscape posture; and if the electronic device is in the landscape posture, the electronic device performs step S203; or if the electronic device is not in the landscape posture, the electronic device performs step 201.

For step S202, refer to step S102. Details are not described herein again.

S203: The electronic device receives the satellite signal M1 by using the first antenna and receives the satellite signal N1 by using the second antenna, to obtain the combined satellite signal W and third signal quality of the combined satellite signal W.

When the electronic device is in the landscape posture, the connection point L2 and the connection point L4 of the combiner 1005 shown in FIG. 10 are connected. The electronic device may receive satellite signals by using the first antenna and the second antenna. A satellite signal received by the first antenna is M1. It is assumed that the satellite signal M1 includes a satellite signal M11 of a satellite 1, a satellite signal M12 of a satellite 2, a satellite signal M13 of a satellite 3, a satellite signal M14 of a satellite 4, and a satellite signal M15 of a satellite 5. A satellite signal received by the second antenna is N1. It is assumed that the satellite signal N1 includes a satellite signal N11 of the satellite 1, a satellite signal N12 of the satellite 2, a satellite signal N13 of the satellite 3, a satellite signal N14 of the satellite 4, and a satellite signal N15 of the satellite 5. If signal quality of the satellite signal M11 is higher than signal It may be understood that Table 3 is merely an example. The first antenna and the second antenna may find a plurality of satellites, and are not limited to a quantity of satellites and satellite IDs in the table.

The electronic device may also perform signal processing on the satellite signals received by the first antenna and the second antenna. Herein, reference may be made to the description that the electronic device performs signal processing on the satellite signal received by the first antenna in step S101, and details are not described herein again.

S204: The electronic device determines whether the first signal quality is lower than the third signal quality; and if the first signal quality is lower than the third signal quality, the electronic device performs step S205; or if the first signal quality is not lower than the third signal quality, the electronic device performs step S206.

For step S204, refer to step S104. Details are not described herein again. It may be understood that, generally, the signal quality of the satellite signal W is higher than the signal quality of the satellite signal M1. If the second antenna is damaged, the signal quality of the satellite signal W may be lower than the signal quality of the satellite signal M1.

S205: The electronic device performs positioning based on the satellite signal W.

When the signal quality of the satellite signal M1 is lower than the signal quality of the satellite signal W, the electronic device performs positioning based on satellite signals received by the first antenna and the second antenna. In this case, the connection point L2 and the connection point L4 in the combiner 1005 shown in FIG. 10 are connected. For step S205, refer to step S105. Details are not described herein again.

S206: The electronic device performs positioning based on the satellite signal M1.

When the signal quality of the satellite signal M1 is higher than the signal quality of the satellite signal W, the electronic device performs positioning based on the satellite signal received by the first antenna. In this case, the connection point L2 and the connection point L4 in the combiner 1005 shown in FIG. 10 are disconnected.

In the positioning method provided in this embodiment of this application, the electronic device has two antennas. The first antenna faces the sky in the portrait posture, and the second antenna faces the sky in the landscape posture. When the electronic device is in the landscape posture, the electronic device may determine whether the signal quality of the satellite signal received by the first antenna is higher than the signal quality of the satellite signal obtained bd combining the satellite signal received by the first antenna and the satellite signal received by the second antenna. If the signal quality of the satellite signal received by the first antenna is higher than the signal quality of the satellite signal obtained by combining the satellite signal received by the first antenna and the satellite signal received by the second antenna, the electronic device performs positioning based on the satellite signal received by the first antenna. If the signal quality of the satellite signal received by the first antenna is not higher than the signal quality of the satellite signal obtained by combining the satellite signal received by the first antenna and the satellite signal received by the second antenna, the electronic device performs positioning based on the satellite signal obtained by combining the satellite signal received by the first antenna and the satellite signal received by the second antenna. In this way, the electronic device can perform positioning more accurately in the landscape posture.

In a possible implementation, if the electronic device switches from the landscape posture to the portrait posture when the electronic device performs positioning based on the satellite signals obtained by using the first antenna and the second antenna, the electronic device performs positioning based on the satellite signal obtained by using the first antenna. That is, in the electronic device, positioning may be performed based on the satellite signal obtained by the first antenna by default when the portrait posture is set.

In a possible implementation, if the electronic device switches from the landscape posture to the portrait posture when the electronic device performs positioning based on the satellite signals obtained by using the first antenna and the second antenna, the electronic device may continue to perform positioning based on the satellite signals received by using the first antenna and the second antenna.

In a scenario, when the electronic device is positioned in the landscape posture or the portrait posture, the electronic device may determine, based on signal quality of a satellite signal received by a vertical antenna, to use the vertical antenna (which may be referred to as the first antenna) or the vertical antenna and a horizontal antenna (which may be referred to as the second antenna) to receive a satellite signal. When the electronic device receives the satellite signals by using the vertical antenna and the horizontal antenna, the electronic device performs maximum signal ratio combination on the satellite signal received by the vertical antenna and the satellite signal received by the horizontal antenna based on a signal strength of each satellite. Then, the electronic device performs positioning based on the combined satellite signal.

Figure 12:
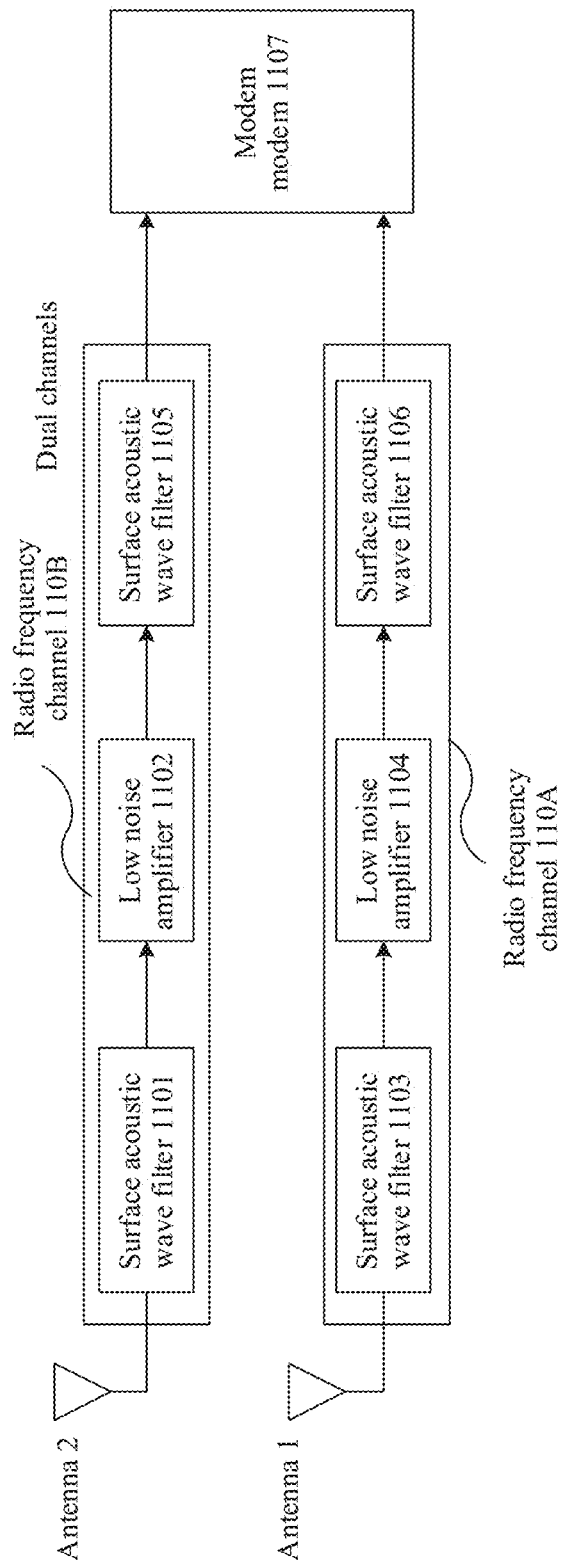
FIG. 12 is a schematic diagram of a circuit for receiving a satellite signal according to an embodiment of this application.

For example. FIG. 12 is a schematic diagram of a circuit for receiving a satellite signal by an electronic device according to an embodiment of this application. In the schematic diagram of the circuit, the circuit for receiving the satellite signal may include an antenna 1, an antenna 2, a radio frequency channel 110A, a radio frequency channel 110B, and a modem 1107.

The antenna 1 and the antenna 2 are used to receive satellite signals. The antenna 1 may be the satellite positioning antenna 10a in FIG. 6, and may be referred to as a vertical antenna. The antenna 2 may be the satellite positioning antenna 10d in FIG. 6, and may be referred to as a horizontal antenna.

The radio frequency channel 110A is used to transmit a satellite signal received by the antenna 1. The radio frequency channel 110A may include a surface acoustic wave filter 1103, a low noise amplifier 1104, and a surface acoustic wave filter 1106.

The surface acoustic wave filter 1103 is configured to filter out a high-order harmonic wave in a satellite signal M1 received by the antenna 1, to obtain a satellite signal M2.

The low noise amplifier 1104 is configured to amplify the satellite signal M2 to obtain a satellite signal M3.

The surface acoustic wave filter 1106 is configured to filter out a noise signal in the satellite signal M3, to obtain a satellite signal M4.

The radio frequency channel 110B is used to transmit a satellite signal received by the antenna 2. The radio frequency channel 110B may include a surface acoustic wave filter 1101, a low noise amplifier 1102, and a surface acoustic wave filter 1105.

The surface acoustic wave filter 1101 is configured to filter out a high-order harmonic wave in a satellite signal N1 received by the antenna 2, to obtain a satellite signal N2.

The low noise amplifier 1102 is configured to amplify the satellite signal N2 to obtain a satellite signal N3.

The surface acoustic wave filter 1105 is configured to filter out a noise signal in the satellite signal N3, to obtain a satellite signal N4.

The modem 1107 is configured to demodulate satellite signals received by the antenna 1 and the antenna 2, and combine the satellite signals received by the antenna 1 and the antenna 2 based on a signal strength of each satellite, to obtain a satellite signal W.

In a possible implementation, the modem 1107 is configured to extract, from the satellite signal M1 and the satellite signal N1, satellite signals with the highest signal quality respectively corresponding to a plurality of satellites, to obtain the satellite signal W.

In a possible implementation, the modem 1107 is configured to: determine, from the satellite signal M1 and the satellite signal N1, satellite signals respectively corresponding to L different satellites, and determine the satellite signals respectively corresponding to the L different satellites as the satellite signal W; when a first satellite in the L different satellites corresponds to one satellite signal, place the one satellite signal corresponding to the first satellite into the satellite signal W; and when a second satellite in the L different satellites corresponds to two satellite signals, adjust the two satellite signals corresponding to the second satellite to be in a same phase, add the two satellite signals in the same phase to form one satellite signal, and place the one satellite signal into the satellite signal W. For example, if the antenna 1 receives a satellite signal M11 of a satellite 1, and the antenna 2 receives a satellite signal N11 of the satellite 1, the modem 1107 may adjust a phase of N11, and then M11 and N11 obtained through phase adjustment are added in-phase.

In a possible implementation, the modem 1107 is configured to: adjust the two satellite signals corresponding to the second satellite to be in the same phase; obtain weights respectively corresponding to the two satellite signals; and multiply the two satellite signals in the same phase by the respective weights, combine multiplied satellite signals into the one satellite signal, and place the one satellite signal into the satellite signal W.

In this embodiment of this application, the satellite signal M1 may be referred to as a first satellite signal. The satellite signal N1 may be referred to as a second satellite signal. The satellite signal W may be referred to as a third satellite signal. The satellite signal M4 may be obtained through signal processing on the first satellite signal. The satellite signal N4 may be obtained through signal processing on the second satellite signal. The satellite signal W may be obtained by combining the satellite signal M4 and the satellite signal N4.

Based on the foregoing schematic diagram of the circuit, an embodiment of this application provides a positioning method.

Figure 13:
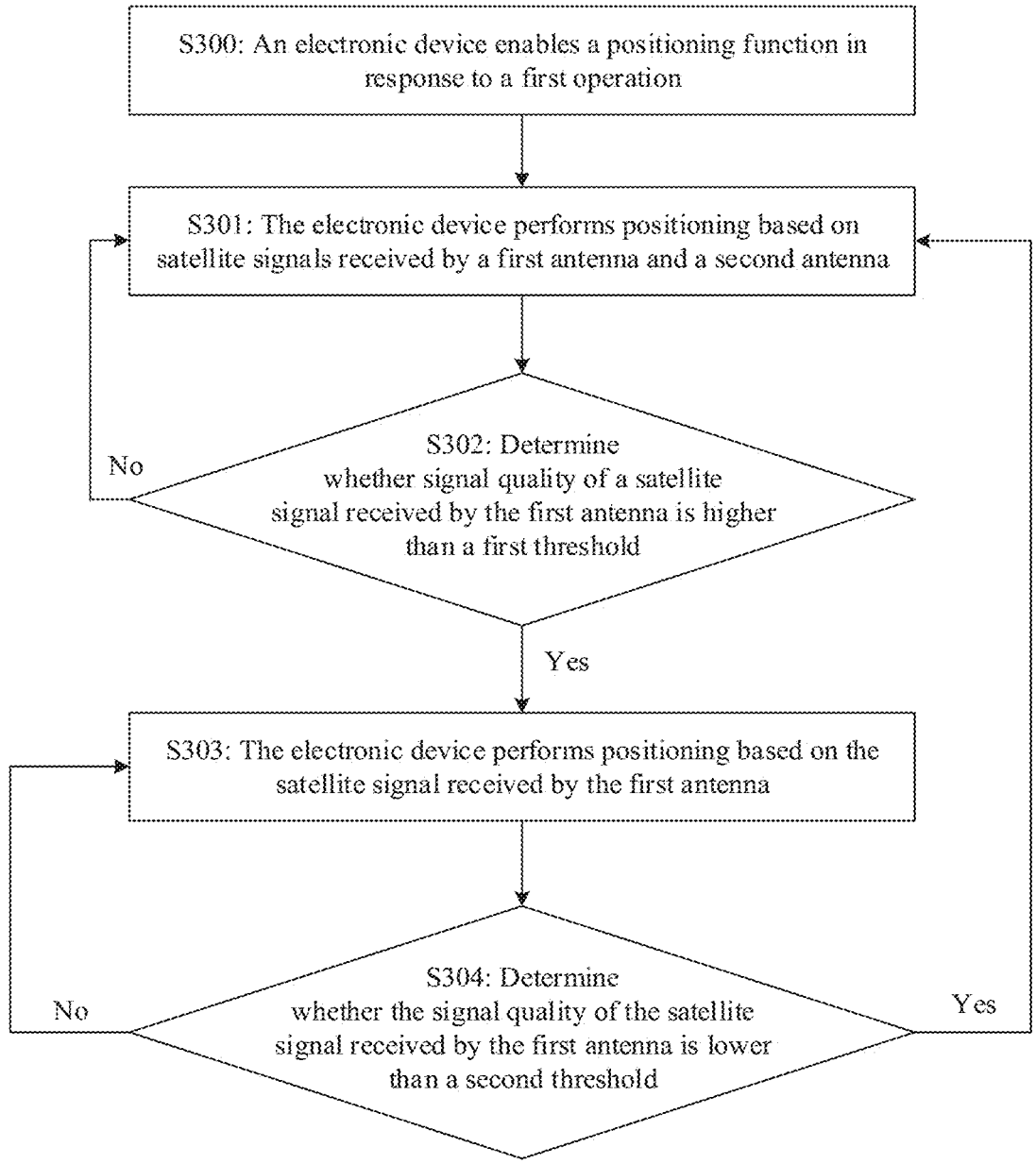
FIG. 13 is a schematic flowchart of a positioning method according to an embodiment of this application.

The positioning method provided in this embodiment of this application is described below in detail with reference to FIG. 13. FIG. 13 is a schematic flowchart of a positioning method according to an embodiment of this application. As shown in FIG. 13, the positioning method provided in this embodiment of this application may include the following steps.

S300: The electronic device enables a positioning function in response to a first operation.

For step S300, refer to step S100 or step S200. Details are not described herein again.

S301: The electronic device performs positioning based on satellite signals received by a first antenna and a second antenna.

During positioning, the electronic device performs positioning based on the satellite signals received by the first antenna and the second antenna by default. The first antenna may be the antenna 10a shown in FIG. 2. The second antenna may be the antenna 10d shown in FIG. 2. In this way; regardless of whether the electronic device is in a portrait posture or a landscape posture, there is an antenna facing the sky. Therefore, the electronic device can obtain satellite signals of more satellites. In this way, the electronic device can perform positioning more accurately.

For a specific process in which the electronic device performs positioning based on the satellite signals, refer to the description in the conventional technology that the electronic device performs positioning based on a GPS satellite signal. Details are not described herein again.

In a possible implementation, the electronic device may process the satellite signals received by the first antenna and the second antenna. Herein, the electronic device may perform signal processing on the satellite signals by using a plurality of methods. For example, the electronic device may perform filtering, amplification processing, and the like on the satellite signals received by the first antenna and the second antenna. A specific signal processing manner is not limited in this application. In this way, accuracy of a positioning result obtained by the electronic device based on the satellite signals can be higher.

In a feasible example, a process in which the electronic device processes the satellite signals received by the first antenna and the second antenna may be shown in FIG. 12. The electronic device may filter out, by using the SAW filter 1103, the high-order harmonic wave in the satellite signal M1 received by the first antenna, to obtain the satellite signal M2. Then, the electronic device may amplify the satellite signal M2 by using the low noise amplifier (low noise amplifier, LNA) 1104, to obtain the satellite signal M3. Then, the electronic device may filter out, by using the SAW filter 1106, the noise signal in the satellite signal M3, to obtain the satellite signal M4. Similarly, the electronic device may filter out, by using the SAW filter 1101, the high-order harmonic wave in the satellite signal N1 received by the first antenna, to obtain the satellite signal N2. Then, the electronic device may amplify the satellite signal N2 by using the LNA 1102, to obtain the satellite signal N3. Then, the electronic device may filter out, by using the SAW filter 1105, the noise signal in the satellite signal N3, to obtain the satellite signal N4. Then, a radio frequency chip (for example, a GNSS-RF chip) in the electronic device transmits the satellite signal M4 and the satellite signal N4 to the modem. Finally, the electronic device performs positioning based on a modulated and demodulated satellite signal M4 and a modulated and demodulated satellite signal N4.

It may be understood that the satellite signal M1 may include satellite signals transmitted by a plurality of satellites. That is, M1 may be a set of a plurality of satellite signals. For example, M1 is (M11, M12, M13, ..., M1m). Herein, m is a quantity of satellites that can be found by the first antenna. Similarly, the satellite signal N1 may include satellite signals transmitted by the plurality of satellites. That is, N1 may be a set of a plurality of satellite signals. For example, N1 is (N11, N12, N13, ..., N1n). Herein, n is a quantity of satellites that can be found by the second antenna.

Further, the electronic device may combine, by using the modem 1107, a satellite signal (for example, a satellite signal M41) of each satellite in the satellite signal M4 (for example, the satellite signal M4 is a satellite signal set of (M41, M42, M43, ..., M4m)) and a satellite signal (for example, a satellite signal N41) of a same satellite in the satellite signal N4 (for example, the satellite signal N4 is a satellite signal set of (N41, N42, N43, ..., N4n)), to obtain the satellite signal W The electronic device performs positioning based on the satellite signal W.

In a possible implementation, the electronic device may determine, from the satellite signal M1 and the satellite signal N1 by using the modem 1107, the satellite signals respectively corresponding to the L different satellites, and determine the satellite signals respectively corresponding to the L different satellites as the satellite signal W. When the first satellite in the L different satellites corresponds to the one satellite signal, the electronic device may place, by using the modem 1107, the one satellite signal corresponding to the first satellite into the satellite signal W. When the second satellite in the L different satellites corresponds to the two satellite signals, the electronic device may adjust, by using the modem 1107, the two satellite signals corresponding to the second satellite to be in the same phase, add the two satellite signals in the same phase to form one satellite signal, and place the one satellite signal into the satellite signal W.

Herein, it is assumed that the satellite signal N41 and the satellite signal M41 are satellite signals transmitted by a same satellite, the satellite signal N42 and the satellite signal M42 are satellite signals transmitted by a same satellite, the satellite signal N43 and the satellite signal M43 are satellite signals transmitted by a same satellite, and the satellite signal N4n and the satellite signal M4m are satellite signals transmitted by a same satellite, the modem 1107 may adjust a phase of the satellite signal N41, so that the satellite signal N41 and the satellite signal M41 may be added in-phase. Similarly, the modem 1107 may adjust a phase of the satellite signal N42, so that the satellite signal N42 and the satellite signal M41 may be added in-phase. The modem 1107 may adjust a phase of the satellite signal N43, so that the satellite signal N43 and the satellite signal M43 may be added in-phase. The modem 1107 may adjust a phase of the satellite signal N4$n$, so that the satellite signal N4$n$ and the satellite signal M4$m$ may be added in-phase.

In a possible implementation, the electronic device may determine, from the satellite signal M1 and the satellite signal N1 by using the modem 1107, the satellite signals respectively corresponding to the L different satellites, and determine the satellite signals respectively corresponding to the L different satellites as the satellite signal W When the first satellite in the L different satellites corresponds to the one satellite signal, the electronic device may place, by using the modem 1107, the one satellite signal corresponding to the first satellite into the satellite signal W. When the second satellite in the L different satellites corresponds to the two satellite signals, the electronic device may adjust, by using the modem 1107, the two satellite signals corresponding to the second satellite to be in the same phase. The electronic device may obtain, by using the modem 1107, weights respectively corresponding to the two satellite signals. The electronic device may multiply, by using the modem 1107, the two satellite signals in the same phase by the respective weights, then perform addition to form one satellite signal, and place the one satellite signal into the satellite signal W.

S302: The electronic device determines whether the signal quality of the satellite signal received by the first antenna is greater than a first threshold, and if the signal quality of the satellite signal received by the first antenna is greater than the first threshold, the electronic device performs step S301; or if the signal quality of the satellite signal received by the first antenna is not greater than the first threshold, the electronic device performs step S303.

The first threshold may be configured in the electronic device. The first threshold may be that a quantity of satellites whose SNRs are greater than 30 is 8. Alternatively; the first threshold may be that an average SNR is 30. For example, if the first antenna can find satellite signals of 20 satellites, step S303 is performed when the quantity of satellites, of the 20 satellites, whose SNRs of the satellite signals are greater than 30 is greater than or equal to 8; or step S301 is performed when the quantity of satellites, of the 20 satellites, whose SNRs of the satellite signals are greater than 30 is less than 8.

S303: The electronic device performs positioning based on the satellite signal received by the first antenna.

If the satellite signal received by the first antenna can meet a positioning requirement, that is, the signal quality of the satellite signal is greater than the first threshold, the electronic device may receive the satellite signal only by using the first antenna. The electronic device performs positioning based on the satellite signal received by the first antenna. For step S303, refer to step S101. Details are not described herein again.

S304: The electronic device determines whether the signal quality of the satellite signal received by the first antenna is lower than a second threshold; and if the signal quality of the satellite signal received by the first antenna is lower than the second threshold, the electronic device performs step S301; or if the signal quality of the satellite signal received by the first antenna is not lower than the second threshold, the electronic device performs step S303.

The second threshold may be configured for the electronic device. The second threshold is less than the first threshold. When the electronic device performs positioning based on the satellite signal received by the first antenna, if the electronic device detects that the signal quality of the satellite signal received by the first antenna is lower than the second threshold, the electronic device performs step S301. That is, the electronic device simultaneously receives satellite signals by using the first antenna and the second antenna. The electronic device performs positioning based on a signal obtained through maximum signal ratio combination on the satellite signals received by the first antenna and the second antenna.

It may be understood that the electronic device may alternatively perform step S303 after performing step S300. That is, the electronic device initially receives a satellite signal by using one antenna (for example, the first antenna). When the signal quality of the satellite signal received by the first antenna is lower than the second threshold, the electronic device receives the satellite signals simultaneously by using the first antenna and the second antenna.

In the positioning method provided in this embodiment of this application, the electronic device may perform positioning based on the satellite signals received by using the two antennas by default. In this way, positioning accuracy of the electronic device can be improved.

When the electronic device determines that positioning accuracy of performing positioning based on a satellite signal obtained by a single antenna can also meet a requirement, the electronic device performs positioning based on the satellite signal received by the single antenna. In this way, power consumption of the electronic device can be reduced. The electronic device may also perform positioning based on the satellite signal received by the single antenna by default. In this way, the power consumption of the electronic device can be reduced. When the positioning accuracy and positioning duration of positioning performed by the electronic device based on the satellite signal received by the single antenna cannot meet a requirement of the electronic device, the electronic device starts to perform positioning based on satellite signals received by two antennas. In this way, the positioning accuracy can be improved and positioning time can be reduced.

The following describes an example of the electronic device 100 provided in an embodiment of this application.

Figure 14:
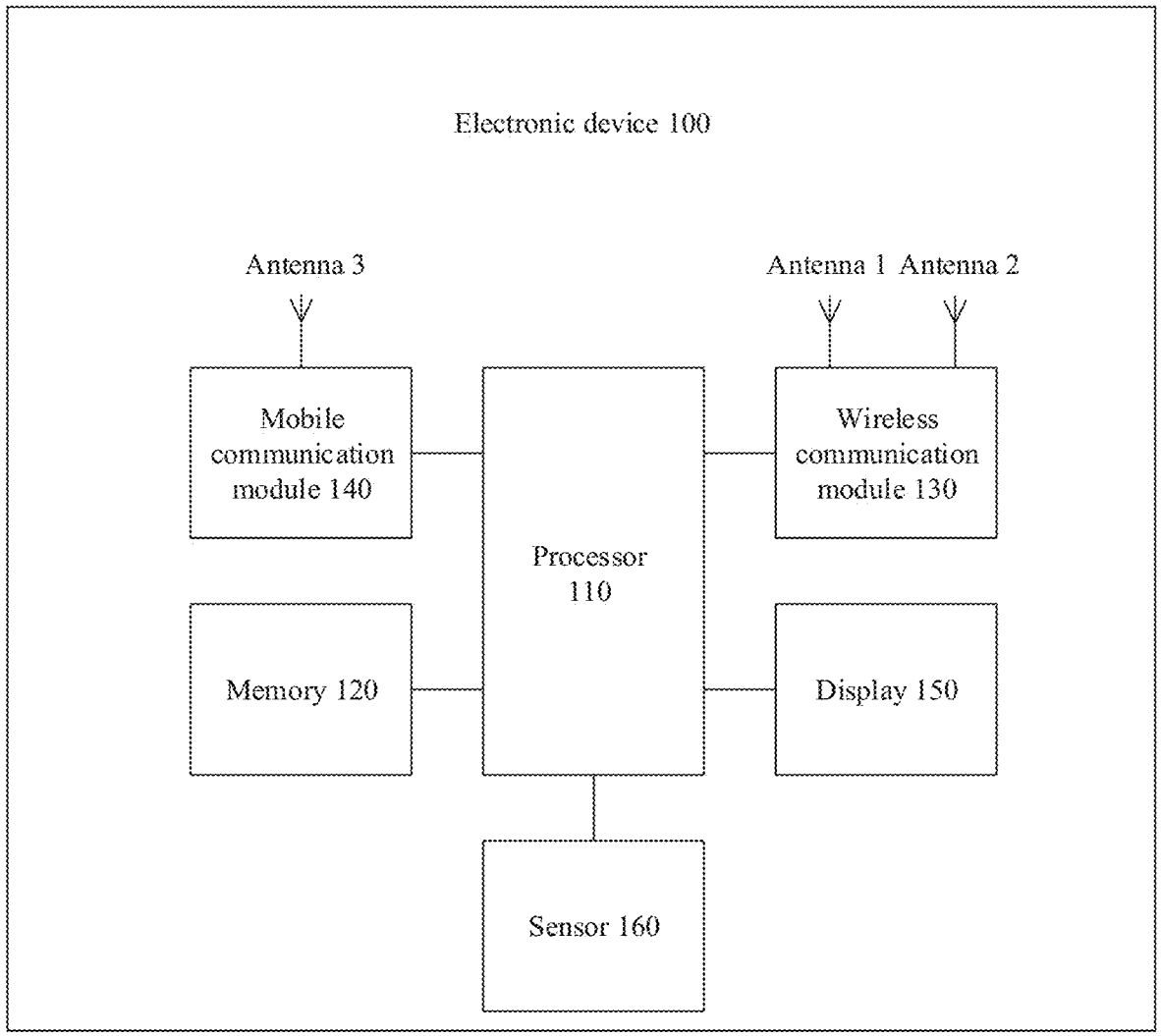
FIG. 14 is a schematic diagram of a hardware structure of an electronic device according to an embodiment of this application.

FIG. 14 is a schematic diagram of a structure of the electronic device 100.

The electronic device 100 is used as an example below to describe the embodiment in detail. It should be understood that the electronic device 100 may have more or fewer components than those shown in the figure, or may combine two or more components, or may have different component configurations. Components shown in the figure may be implemented by hardware that includes one or more signal processing and/or application-specific integrated circuits, software, or a combination of hardware and software.

The electronic device 100 may include a processor 110, a memory 120, an antenna 1, an antenna 2, an antenna 3, a wireless communication module 130, a mobile communication module 140, a display 150, a sensor 160, and the like.

It may be understood that the structure shown in this embodiment of the present invention does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may be configured to decode satellite ephemeris based on satellite signals of the electronic device received by the antenna 1 and the antenna 2. When four satellites are locked at the same time, coordinates of a measured point (for example, a location of the electronic device or a destination entered by a user) may be calculated.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like, Different processing units may be independent components, or may be integrated into one or more processors.

The controller may be a nerve center and a command center of the electronic device 100. The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) port, and/or the like.

The I2C interface is a two-way synchronous serial bus, including a serial data line (serial data line, SDA) and a serial clock line (serial clock line, SCL).

The I2S interface may be used to perform audio communication.

The PCM interface may also be used to perform audio communication, and sample, quantize, and code an analog signal.

The UART interface is a universal serial data bus, and is used to perform asynchronous communication. The bus may be a two-way communication bus. The bus converts to-be-transmitted data between serial communication and parallel communication.

The MIPI interface may be used to connect the processor 110 to a peripheral component such as the display 150, The MIPI interface includes a camera serial interface (camera serial interface, CSI), a display serial interface (display serial interface, DSI), and the like. The processor 110 communicates with the display 150 through the DSI, to implement a display function of the electronic device 100.

The GPIO interface may be configured by software. The GPIO interface may be configured as a control signal or a data signal.

It may be understood that an interface connection relationship between the modules that is shown in this embodiment of the present invention is merely an example for description, and does not constitute a limitation on the structure of the electronic device 100. In some other embodiments of this application, the electronic device 100 may alternatively use an interface connection manner different from that in the foregoing embodiment, or use a combination of a plurality of interface connection manners.

A wireless communication function of the electronic device 100 may be implemented through the antenna 1, the antenna 2, the antenna 3, the wireless communication module 130, the mobile communication module 140, the modem processor, the baseband processor, and the like.

The antenna 1, the antenna 2, and the antenna 3 are configured to transmit and receive an electromagnetic wave signal. Each antenna in the electronic device 100 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

Specifically, the antenna 1 and the antenna 2 are configured to receive an electromagnetic wave signal transmitted by a satellite. The antenna 1 faces the sky when the electronic device is in a portrait posture. The antenna 2 faces the sky when the electronic device is in a landscape posture.

In this embodiment of this application, radio frequency pre-circuits in which the antenna 1 and the antenna 2 are located may further respectively include a surface acoustic wave filter and a low noise amplifier. A surface acoustic wave filter in a radio frequency pre-circuit in Which the antenna 1 is located is configured to filter out a high-order harmonic wave in a satellite signal received by the antenna 1. A low noise amplifier in the radio frequency pre-circuit in which the antenna 1 is located is configured to amplify the satellite signal received by the antenna 1. A surface acoustic wave filter in a radio frequency pre-circuit in which the antenna 2 is located is configured to filter out a high-order harmonic wave in a satellite signal received by the antenna 2. A low noise amplifier in the radio frequency pre-circuit in which the antenna 2 is located is configured to amplify the satellite signal received by the antenna 2.

In some embodiments, the antenna 1 and the antenna 2 may be connected to a switch, and the switch is configured to select the antenna 1 to receive the satellite signal or select the antenna 2 to receive the satellite signal. For details about how the antenna 1 and the antenna 2 are specifically connected to the switch and how the switch selects the antenna 1 or the antenna 2, refer to the foregoing description of the schematic diagram of the circuit shown in FIG. 7. Details are not described herein again.

In some embodiments, the antenna 1 and the antenna 2 may be connected to a combiner. The combiner may select the antenna 1 or the antenna 1 and the antenna 2 to receive a satellite signal. When the combiner selects the antenna 1 and the antenna 2 to receive the satellite the combiner combines the satellite signal received by the antenna 1 with the satellite signal received by the antenna 2. For details herein, refer to the foregoing description of the schematic diagram of the circuit shown in FIG. 10. Details are not described herein again.

In some embodiments, the antenna 3 and the mobile communication module 150 in the electronic device 100 are coupled, and the antenna 1, the antenna 2, and the wireless communication module 160 in the electronic device 100 are coupled, so that the electronic device 100 can communicate with a network and another device by using a wireless communication technology. The wireless communication technology may include a global system for mobile communications (global system tbr mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NEC, FM, an IR technology, and/or the like. The GNSS may include a global positioning system (global positioninu system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The wireless communication module 130 may provide a wireless communication solution that is applied to the electronic device 100 and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communication module 130 may be one or more components integrating at least one communication processor module. The wireless communication module 130 receives an electromagnetic wave through the antenna 1 and/or antenna 2, performs frequency modulation and filtering processing on the electromagnetic wave signal, and sends a processed signal to the processor 110. When the antenna 1 and the antenna 2 simultaneously receive electromagnetic waves (which may be referred to as satellite signals in this application) transmitted by a satellite, the wireless communication module 130 may perform, based on each satellite, maximum signal ratio combination on the satellite signal received by the antenna 1 and the satellite signal received by the antenna 2. For details, refer to the foregoing description of the schematic diagram of the circuit shown in FIG. 12. Details are not described herein again.

The mobile communication module 140 can provide a solution, applied to the electronic device 100, to wireless communication including 2G, 3G, 4G, 5G, and the like. The mobile communication module 140 may include at least one filter, a switch, a power amplifier, a low noise amplifier (low noise amplifier, LNA), and the like. The mobile communication module 140 may receive an electromagnetic wave through the antenna 3, perform processing such as filtering or amplification on the received electromagnetic wave, and transmit the electromagnetic wave to the modem processor for demodulation. The mobile communication module 140 may further amplify a signal modulated by the modem processor, and convert the signal into an electromagnetic wave for radiation through the antenna 3. In some embodiments, at least some functional modules in the mobile communication module 140 may be disposed in the processor 110. In some embodiments, at least some functional modules of the mobile communication module 140 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device, or displays an image or a video through the display 150. In some embodiments, the modem processor may be an independent component. In some other embodiments, the modem processor may be independent of the processor 110, and is disposed in a same device as the mobile communication module 140 or another functional module.

In some embodiments, the processor 110 may perform positioning with reference to base station location information obtained by the mobile communication module 140 and the satellite signals received by the antenna 1 and the antenna 2.

The electronic device 100 may implement a display function through the GPU, the display 150, the application processor, and the like. The GPU is a microprocessor for image processing, and is connected to the display 150 and the application processor. The GPU is configured to: perform mathematical and geometric computation, and render an image. The processor 110 may include one or more GPUs, which execute program instructions to generate or change display information.

The display 150 is configured to display an image, a video, and the like. The display 150 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini-LED, a micro-LED, a micro-OLED, a quantum dot light emitting diode (quantum dot light emitting diode, QLED), or the like. In some embodiments, the electronic device 100 may include one or N displays 150, where N is a positive integer greater than 1.

The memory 120 may be configured to store computer-executable program code. The executable program code includes instructions. The processor 110 runs the instructions stored in the memory 120, to perform various function applications of the electronic device 100 and data processing. The memory 120 may include a program storage area and a data storage area. The program storage area may store an operating system, an application required by at least one function (for example, a voice playing function or an image playing function), and the like. The data storage area may store data (such as audio data and an address book) created during use of the electronic device 100, and the like. In addition, the memory 120 may include a high-speed random access memory, and may further include a non-volatile memory, for example, at least one magnetic disk storage device, a flash memory device, or a universal flash storage (universal flash storage, UFS).

In this embodiment of this application, the memory 120 is further configured to store a satellite ephemeris, a satellite calendar, and the like.

The sensor 160 may include a pressure sensor, a gyroscope sensor, a barometric pressure sensor, a magnetic sensor, an acceleration sensor, a touch sensor, a bone conduction sensor, and the like.

The pressure sensor is configured to sense a pressure signal, and can convert the pressure signal into an electrical signal. In some embodiments, the pressure sensor may be disposed in the display 150. There are many types of pressure sensors such as a resistive pressure sensor, an inductive pressure sensor, and a capacitive pressure sensor. The capacitive pressure sensor may include at least two parallel plates made of conductive materials. When a fixce is applied to the pressure sensor, capacitance between electrodes changes. The electronic device 100 determines pressure intensity based on the change in the capacitance. When a touch operation is performed on the display 150, the electronic device 100 detects intensity of the touch operation through the pressure sensor. The electronic device 100 may also calculate a touch position based on a detection signal of the pressure sensor. In some embodiments, touch operations that are performed in a same touch position but have different touch operation intensity may correspond to different operation instructions. For example, when a touch operation whose touch operation intensity is less than a first pressure threshold is performed on an SMS message application icon, an instruction for viewing an SMS message is performed. When a touch operation whose touch operation intensity is greater than or equal to the first pressure threshold is performed on the SMS message application icon, an instruction for creating an SMS message is performed.

The gyroscope sensor may be configured to determine a moving posture of the electronic device 100. In some embodiments, an angular velocity of the electronic device 100 around three axes (namely, axes x, y, and z) may be determined through the gyroscope sensor. The gyroscope sensor may be configured to implement image stabilization during photographing. For example, when a shutter is pressed, the gyroscope sensor detects an angle at which the electronic device 100 jitters, calculates, based on the angle, a distance for which a lens module needs to compensate, and allows the lens to cancel the jitter of the electronic device 100 through reverse motion, to implement image stabilization. The gyroscope sensor may also be used in navigation and somatic game scenarios. The electronic device may determine a posture of the electronic device through the gyroscope sensor, that is, determine whether the electronic device is currently in a portrait posture or a landscape posture.

In some embodiments, the electronic device 100 may further include a posture sensor. The posture sensor is configured to detect the posture of the electronic device.

The barometric pressure sensor is configured to measure barometric pressure. In some embodiments, the electronic device 100 calculates an altitude through a barometric pressure measured by the barometric pressure sensor, to assist in positioning and navigation.

The magnetic sensor includes a Hall sensor. The electronic device 100 may detect opening and closing of a flip cover by using the magnetic sensor. In some embodiments, when the electronic device 100 is a flip phone, the electronic device 100 may detect opening and closing of a flip cover based on the magnetic sensor. Further, a feature such as automatic unlocking upon opening of the flip cover is set based on a detected opening or closing state of the flip cover.

The acceleration sensor may detect accelerations in various directions usually on three axes) of the electronic device 100, and may detect magnitude and a direction of gravity when the electronic device 100 is still. The acceleration sensor may be further configured to identify a posture of the electronic device, and is used in an application such as switching between a landscape mode and a portrait mode or a pedometer. In this application, the electronic device 100 may perform switching between the landscape mode and the portrait mode and switching between single-screen display and large-screen display of a foldable screen based on a change of an acceleration value and a gravity value detected by the acceleration sensor.

The distance sensor is configured to measure a distance. The electronic device 100 may measure the distance in an infrared manner or a laser manner. In some embodiments, in a photographing scenario, the electronic device 100 may measure the distance through the distance sensor to implement quick focusing.

The touch sensor is also referred to as a "touch panel". The touch sensor 180K may be disposed in the display 150, and the touch sensor 180K and the display 150 constitute a touchscreen, which is also referred to as a "touch screen". The touch sensor is configured to detect a touch operation performed on or near the touch sensor. The touch sensor may transfer the detected touch operation to the application processor to determine a type of the touch event. The display 150 may provide a visual output related to the touch operation. In some other embodiments, the touch sensor may also be disposed on a surface of the electronic device 100 at a location different from that of the display 150.

The bone conduction sensor may obtain a vibration signal.

Figure 15:
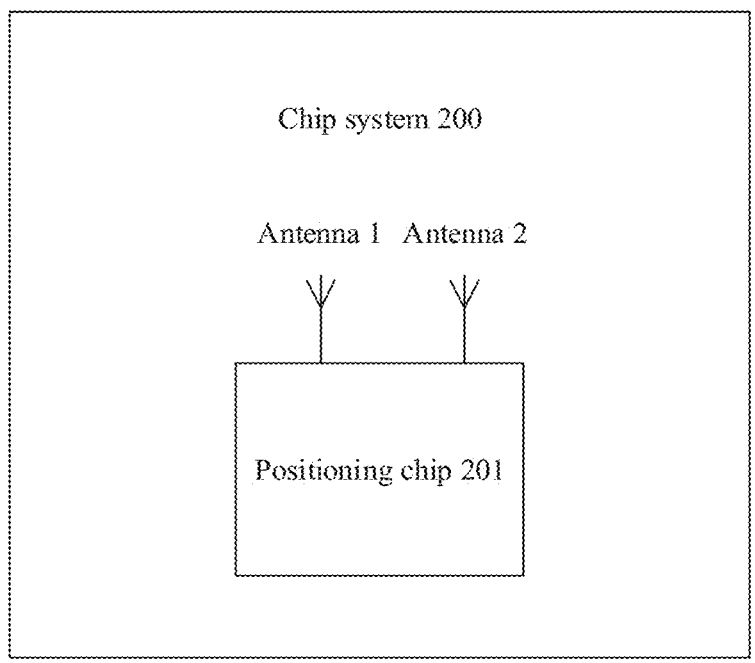
FIG. 15 is a schematic diagram of a chip system according to an embodiment of this application.

FIG. 15 shows a chip system 200 according to an embodiment of this application. As shown in FIG. 15, the chip system 200 may include an antenna 1, an antenna 2, and a positioning chip 201.

The antenna 1 is configured to receive a satellite signal, and the antenna 2 is configured to receive a satellite signal.

The positioning chip 201 may be configured to perform the following steps:

1. controlling the antenna 1 or the antenna 2 to receive a satellite signal;

2. performing signal processing on the satellite signal received by the antenna 1 or the antenna 2, and comparing signal quality of the satellite signal received by the antenna 1 with signal quality of the satellite signal received by the antenna 2; and 3. if the signal quality of the satellite signal received by the antenna 1 is lower than the signal quality of the satellite signal received by the antenna 2, selecting the antenna 2 to receive the satellite signal, and performing positioning based on the satellite signal received by the antenna 2; or if the signal quality of the satellite signal received by the antenna 1 is higher than the signal quality of the satellite signal received by the antenna 2, selecting the antenna 1 to receive the satellite signal, and performing positioning based on the satellite signal received by the antenna 1.

Herein, reference may be made to the embodiment shown in FIG. 8A. Details are not described herein again.

In some embodiments, the positioning chip 201 may be further configured to perform the following steps:

1. selecting the antenna 1 or the antenna 1 and the antenna 2 to receive a satellite signal;

2. receiving a satellite signal M1 by using a first antenna, obtaining first signal quality of the satellite signal M1, receiving the satellite signal M1 by using the first antenna and receiving a satellite signal N1 by using a second antenna, obtaining a combined satellite signal W and third signal quality of the satellite signal W, comparing the first signal quality with the third signal quality, and when the first signal quality is lower than the third signal quality, receiving the satellite signal by using the first antenna and the second antenna; and 3. performing positioning based on the satellite signal.

Herein, reference may be made to the embodiment shown in FIG. 11. Details are not described herein again.

In some embodiments, the positioning chip 201 pray be further configured to perform the following steps:

1. selecting the antenna 1 or the antenna 1 and the antenna 2 to receive a satellite signal;

2. determining whether signal quality of the satellite signal received by the first antenna is greater than a first threshold; and if the signal quality is greater than the first threshold, performing positioning based on the satellite signal received by the first antenna;

3. determining whether the signal quality of the satellite signal received by the first antenna is lower than a second threshold; and if the signal quality is lower than the second threshold, performing positioning based on satellite signals received by the first antenna and the second antenna; and 4. demodulating the satellite signals received by the first antenna and the second antenna, and perfortning maximum signal ratio combination on the satellite signals received by the first antenna and the second antenna based on a signal strength of each satellite. For example, if the first antenna receives a satellite signal M11 of a satellite 1, and the second antenna receives a satellite signal N11 of the satellite 1, the modem 1107 may adjust a phase of N11, and then M11 and N11 obtained through phase adjustment are added in-phase.

Herein, reference may be made to the embodiment shown in FIG. 13. Details are not described herein again.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the current technology, or some of the technical solutions may be implemented in the form of a software product. The computer software product is stored in a storage medium, and includes several instructions for instructing a computer device (which may be a personal computer, a server, or a network device) or a processor (processor) to perform all or some of the steps of the methods described in embodiments of this application. The foregoing storage medium includes any medium that can store program code, such as a USB flash drive, a removable hard disk, a ROM, a RAM, a magnetic disk, or an optical disc.

In conclusion, the foregoing embodiments are merely intended for describing the technical solutions of this application, but are not to limit this application. Although this application is described in detail with reference to the thregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A method implemented by an electronic device, wherein the method comprises:
   receiving a first satellite signal using a first antenna of the electronic device when the electronic device is in a portrait mode;
   receiving a second satellite signal using a second antenna of the electronic device when the electronic device is in a landscape mode;
   detecting that the electronic device is a landscape mode;
   in response to detecting the landscape mode, performing a first positioning using the second antenna when a first signal quality of the first satellite signal is lower than a second signal quality of the second satellite signal; and
   in response to detecting the landscape mode, performing a second positioning using the first antenna when the first signal quality is higher than the second signal quality; combining the first satellite signal and the second satellite signal to obtain a third satellite signal; and further determining a location information based on the third satellite signal.

2. The method of claim 1, wherein a first main lobe direction in a first antenna directivity pattern of the first antenna is different from a second main lobe direction in a second antenna directivity pattern of the second antenna.

3. The method of claim 1, further comprising performing a third positioning using the first antenna and the second antenna when the first signal quality is lower than the second signal quality.

4. The method of claim 3, further comprising determining location information based on the first satellite signal and the second satellite signal.

5. The method of claim 4, further comprising:
   combining the first satellite signal and the second satellite signal to obtain a third satellite signal; and
   further determining the location information based on the third satellite signal.

6. The method of claim 5, further comprising extracting, from the first satellite signal and the second satellite signal, fourth satellite signals with a highest signal quality corresponding to a plurality of satellites to obtain the third satellite signal.

7. The method of claim 5, further comprising:
   determining, from the first satellite signal and the second satellite signal, fourth satellite signals corresponding to L different satellites;
   setting the fourth satellite signals as the third satellite signal;

placing, when a first satellite in the L different satellites corresponds to a fifth satellite signal, the fifth satellite signal into the third satellite signal; and when a second satellite in the L different satellites corresponds to two sixth satellite signals:
adjusting the two sixth satellite signals to be in a same phase to obtain two seventh satellite signals;
adding the two seventh satellite signals to form an eighth satellite signal; and
placing the eighth satellite signal into the third satellite signal.

8. The method of claim 7, further comprising:
obtaining a first weight corresponding to a first of the two seventh satellite signals and a second weight corresponding to a second of the two seventh satellite signals;
multiplying the first of the two seventh satellite signals with the first weight to obtain a ninth satellite signal;
multiplying the second of the two seventh satellite signals with the second weight to obtain a tenth satellite signal; and
further adding the ninth satellite signal and the tenth satellite signal to form the eighth satellite signal.

9. An electronic device comprising:
a first antenna configured to receive a first satellite signal comprising a first signal quality when the electronic device is in a portrait mode;
a second antenna configured to receive a second satellite signal comprising a second signal quality when the electronic device is in a landscape mode;
a sensor configured to detect that the portrait mode to the landscape mode;
a path selection component coupled to the first antenna and the second antenna and configured to select the first antenna to receive the first satellite signal or the second antenna to receive the second satellite signal; and
a baseband processor coupled to the path selection component and configured to:
in response to detecting the landscape mode, perform a first positioning using the second antenna when the first signal quality is lower than the second signal quality; and
in response to detecting the landscape, perform a second positioning using the first antenna when the first signal quality is higher than the second signal quality; combine the first satellite signal and the second satellite signal to obtain a third satellite signal; and determine first location information based on the third satellite signal.

10. The electronic device of claim 9, wherein a first main lobe direction in a first antenna directivity pattern of the first antenna is different from a second main lobe direction in a second antenna directivity pattern of the second antenna.

11. The electronic device of claim 9, further comprising:
a first radio frequency component coupled to the first antenna and configured to transmit the first satellite signal, wherein the first antenna is further coupled to the path selection component using the first radio frequency component; and
a second radio frequency component coupled to the second antenna and configured to transmit the second satellite signal, wherein the second antenna is further coupled to the path selection component using the second radio frequency component.

12. The electronic device of claim 9, wherein the baseband processor is further configured to perform a third positioning using the first antenna and the second antenna when the first signal quality is lower than the second signal quality.

13. The electronic device of claim 12, wherein the baseband processor is further configured to determine location information based on the first satellite signal and the second satellite signal.

14. The electronic device of claim 13, wherein the baseband processor is further configured to:
combine the first satellite signal and the second satellite signal to obtain a third satellite signal; and
further determine the location information based on the third satellite signal.

15. The electronic device of claim 14, wherein the baseband processor is further configured to extract, from the first satellite signal and the second satellite signal, fourth satellite signals with a highest signal quality corresponding to a plurality of satellites to obtain the third satellite signal.

16. The electronic device of claim 14, wherein the baseband processor is further configured to:
determine, from the first satellite signal and the second satellite signal, fourth satellite signals corresponding to L different satellites;
set the fourth satellite signals as the third satellite signal;
place, when a first satellite in the L different satellites corresponds to a fifth satellite signal, the fifth satellite signal into the third satellite signal; and
when a second satellite in the L different satellites corresponds to two sixth satellite signals:
adjust the two sixth satellite signals to be in a same phase to obtain two seventh satellite signals;
add the two seventh satellite signals to form an eighth satellite signal; and
place the eighth satellite signal into the third satellite signal.

17. The electronic device of claim 16, wherein the baseband processor is further configured to:
obtain a first weight corresponding to a first of the two seventh satellite signals and a second weight corresponding to a second of the two seventh satellite signals;
multiply the first of the two seventh satellite signals with the first weight to obtain a ninth satellite signal;
multiply the second of the two seventh satellite signals with the second weight to obtain a tenth satellite signal; and
further add the ninth satellite signal and the tenth satellite signal to form the eighth satellite signal.

18. A positioning chip applied in a positioning apparatus, wherein the positioning chip is configured to:
in response to an indication of a landscape mode from the positioning apparatus, perform a first positioning using a second antenna of the positioning apparatus when a first signal quality of a first satellite signal using a first antenna is lower than a second signal quality of a second satellite signal using the second antenna, wherein the first satellite signal is associated with a portrait mode and the second satellite signal is associated with the landscape mode; and
in response to the indication, perform a second positioning using the first antenna when the first signal quality is higher than the second signal quality; combine the first satellite signal and the second satellite signal to obtain a third satellite signal; and determine first location information based on the third satellite signal.

19. The positioning chip of claim 18, wherein the positioning chip is further configured to perform a third positioning using the first antenna and the second antenna when the first signal quality is lower than the second signal quality.

20. The positioning chip of claim 19, wherein the positioning chip is further configured to:
   combine the first satellite signal and the second satellite signal to obtain a third satellite signal; and
   determine location information based on the third satellite signal.

* * * * *